US00RE42967E

(19) United States
(12) Reissued Patent
Kim et al.

(10) Patent Number: US RE42,967 E
(45) Date of Reissued Patent: Nov. 29, 2011

(54) STRUCTURE OF DRIVING UNIT IN DRUM TYPE WASHING MACHINE

(75) Inventors: Kwang Soo Kim, Changwon-shi (KR); Jae Mun Kim, Chinhae-shi (KR)

(73) Assignee: LG Electronics Inc., Seoul (KR)

(21) Appl. No.: 11/602,777

(22) Filed: Nov. 21, 2006

Related U.S. Patent Documents

Reissue of:
(64) Patent No.: 6,510,716
Issued: Jan. 28, 2003
Appl. No.: 09/690,628
Filed: Oct. 18, 2000

U.S. Applications:
(62) Division of application No. 11/043,912, filed on Jan. 27, 2005.

(30) Foreign Application Priority Data

Oct. 19, 1999 (KR) ..... 99/45319
Oct. 19, 1999 (KR) ..... 99/45320
Oct. 19, 1999 (KR) ..... 99/45321
Oct. 19, 1999 (KR) ..... 99/45323

(51) Int. Cl.
*D06F 37/30* (2006.01)
(52) U.S. Cl. ..... 68/58; 68/140
(58) Field of Classification Search ..... 68/24, 58, 68/142, 133; 134/184, 198
See application file for complete search history.

(56) References Cited

U.S. PATENT DOCUMENTS 1,632,182 A * 6/1927 Haskins ..... 366/169.1
(Continued)

FOREIGN PATENT DOCUMENTS

DE 16 28 375 6/1966
(Continued)

OTHER PUBLICATIONS

EP application-related communication dated Apr. 22, 1998.
(Continued)

*Primary Examiner* — Frankie L Stinson
(74) *Attorney, Agent, or Firm* — KED & Associates, LLP

(57) ABSTRACT

Structure of a driving unit in a drum type washing machine including a tub for storing washing water, a drum of a metal rotatably mounted inside of the tub disposed horizontal to the ground, or with an angle to the ground for accommodating laundry therein, a shaft connected to the drum mounted inside of the tub through the tub for transmission of a driving force of the motor to the drum, bearings fitted onto outer circumferences of both end portions of the shaft for supporting the shaft, a bearing housing having stator fastening bosses at fixed intervals along a circumference of a central portion thereof for supporting the bearings, a stator having a plurality of magnetic cores each formed by stacking magnetic laminations each having a salient pole projected outward in a radial direction and a rib projected inward in a radial direction, both of which are formed as one unit, frames of insulating material for covering top and bottom surfaces of a magnetic core assembly of the magnetic cores, and coils each wound around each of the salient poles of the magnetic cores, a cup formed rotor having a rotor body of iron or iron alloy with a sidewall, a back yoke, forming a magnetic flux path and a rear wall formed as a unit with the sidewall, and permanent magnets fitted to a setting surface of an "L" formed bent portion of the sidewall, and a connector connecting the rotor and the shaft, thereby reducing noise and troubles as well as a power loss, to improve a productivity of the rotor and the product.

13 Claims, 15 Drawing Sheets

U.S. PATENT DOCUMENTS

| | | | | | |
|---|---|---|---|---|---|
| 1,651,083 | A | * | 11/1927 | Brotz | 134/188 |
| 1,656,281 | A | | 1/1928 | Layne | |
| 1,910,610 | A | | 5/1933 | Kingston | |
| 2,103,797 | A | * | 12/1937 | Stoddard | 137/562 |
| 2,192,316 | A | * | 3/1940 | Kellermann | 68/133 |
| 2,250,315 | A | * | 7/1941 | Rocke | 68/184 |
| 2,264,202 | A | * | 11/1941 | Forney | 68/23.4 |
| 2,268,454 | A | * | 12/1941 | Kucher | 68/184 |
| 2,835,123 | A | * | 5/1958 | Galinski | 68/140 |
| 3,138,727 | A | | 6/1964 | Ellner | 310/40 R |
| 3,178,963 | A | | 4/1965 | Walton | |
| 3,194,032 | A | | 7/1965 | Von Brimer | |
| 3,348,300 | A | | 10/1967 | Kauri | |
| 3,592,517 | A | | 7/1971 | Harris | |
| 3,664,760 | A | * | 5/1972 | Reiner | 415/174.2 |
| 3,772,544 | A | | 11/1973 | Wrobel | |
| 3,805,919 | A | * | 4/1974 | Nakamura et al. | 184/6 |
| 3,866,071 | A | | 2/1975 | Hallerback | |
| 4,061,002 | A | * | 12/1977 | Drews | 68/212 |
| 4,215,285 | A | * | 7/1980 | Lewis | 310/90 |
| 4,434,630 | A | * | 3/1984 | Ikeda | 68/18 F |
| 4,535,262 | A | * | 8/1985 | Newberg | 310/88 |
| 4,623,812 | A | | 11/1986 | van de Griend | |
| 4,631,771 | A | | 12/1986 | Anderson et al. | |
| 4,647,803 | A | | 3/1987 | Von der Heide et al. | |
| 4,689,511 | A | * | 8/1987 | Baker et al. | 310/88 |
| 4,707,910 | A | | 11/1987 | Saeed | |
| 4,712,035 | A | | 12/1987 | Forbes et al. | |
| 4,754,697 | A | | 7/1988 | Asselbergs | |
| 4,819,460 | A | * | 4/1989 | Obradovic | 68/23.7 |
| 4,900,957 | A | * | 2/1990 | Barker et al. | 310/62 |
| 4,904,166 | A | * | 2/1990 | Wasemann | 417/360 |
| 4,906,881 | A | | 3/1990 | Knight | |
| 4,910,420 | A | | 3/1990 | Hoover et al. | |
| 4,939,397 | A | * | 7/1990 | Morrill | 310/88 |
| 5,014,141 | A | | 5/1991 | Gervais et al. | |
| 5,120,139 | A | * | 6/1992 | Asada et al. | 384/107 |
| 5,150,589 | A | * | 9/1992 | Williams et al. | 68/23.7 |
| 5,232,350 | A | * | 8/1993 | Richardson | 417/360 |
| 5,243,244 | A | * | 9/1993 | Kasberger et al. | 310/88 |
| 5,266,855 | A | | 11/1993 | Smith et al. | |
| 5,353,613 | A | * | 10/1994 | Smith et al. | 68/23.7 |
| 5,528,092 | A | | 6/1996 | Ohta | |
| 5,561,993 | A | | 10/1996 | Elgersma et al. | |
| 5,619,871 | A | * | 4/1997 | Forbes et al. | 68/23.7 |
| 5,737,944 | A | * | 4/1998 | Nishimura et al. | 68/23.7 |
| 5,778,703 | A | | 7/1998 | Imai et al. | |
| 5,808,390 | A | | 9/1998 | Miyazawa et al. | |
| 5,809,809 | A | | 9/1998 | Neumann | |
| 5,842,358 | A | | 12/1998 | Koo et al. | |
| 5,860,299 | A | * | 1/1999 | Eum et al. | 68/23.7 |
| 5,862,686 | A | | 1/1999 | Skrippek | |
| 5,894,746 | A | | 4/1999 | Skrippek | |
| 5,927,106 | A | * | 7/1999 | Pellerin | 68/140 |
| 6,037,726 | A | | 3/2000 | Tabata et al. | |
| 6,049,147 | A | | 4/2000 | Sanada et al. | |
| 6,049,930 | A | * | 4/2000 | Hisano et al. | 8/159 |
| 6,118,195 | A | | 9/2000 | Hauer | |
| 6,131,422 | A | | 10/2000 | Skrippek et al. | |
| 6,148,647 | A | | 11/2000 | Kabeya et al. | |
| 6,239,532 | B1 | | 5/2001 | Hollenbeck et al. | |
| 6,341,507 | B1 | | 1/2002 | Rode et al. | |
| 6,343,492 | B1 | | 2/2002 | Seager et al. | |
| 6,396,190 | B1 | | 5/2002 | Ahn et al. | |

FOREIGN PATENT DOCUMENTS

| | | | |
|---|---|---|---|
| DE | 2441118 | | 3/1976 |
| DE | 43 35 966 | A1 | 4/1995 |
| EP | 0 103 418 | | 3/1984 |
| EP | 0 620 308 | A2 | 10/1994 |
| EP | 0 655 824 | A2 | 5/1995 |
| EP | 0 657 575 | A1 | 6/1995 |
| EP | 0 779 338 | A2 | 6/1997 |
| EP | 1 094 145 | A2 | 4/2001 |
| GB | 2 332 212 | A | 6/1999 |
| JP | 61-17877 | | 2/1986 |
| JP | 2-14278 | | 1/1990 |
| JP | 02-205596 | * | 12/1990 |
| JP | 2-305596 | | 12/1990 |
| JP | 3-198646 | | 8/1991 |
| JP | 04-161037 | | 6/1992 |
| JP | 4-317547 | | 11/1992 |
| JP | 05-176488 | | 7/1993 |
| JP | 7-67283 | * | 3/1995 |
| JP | 7-68086 | | 3/1995 |
| JP | 9-103596 | | 4/1997 |
| JP | 10-201993 | * | 8/1998 |
| JP | 10-289505 | | 10/1998 |
| JP | 10-295069 | | 11/1998 |
| JP | 10-322964 | | 12/1998 |
| JP | 11-028298 | | 2/1999 |
| KR | 1999-013456 | | 2/1998 |
| KR | 1998-0012784 | | 4/1998 |
| KR | 1998-058943 | | 10/1998 |
| KR | 1999-0030909 | | 5/1999 |
| KR | 1999-0031045 | | 5/1999 |
| KR | 1999-0033908 | | 5/1999 |
| KR | 10-2001-0037666 | | 5/2001 |
| KR | 10-2001-0037668 | | 5/2001 |
| KR | 10-2001-0037670 | | 5/2001 |
| KR | 10-2001-0037671 | | 5/2001 |
| WO | WO 98/00902 | | 1/1998 |
| WO | WO 98/59102 | | 12/1998 |

OTHER PUBLICATIONS

EPO Search Report dated Sep. 30, 2002.
JP Office Action dated Feb. 12, 2003.
EP application-related communication dated Dec. 17, 2003.
EPO communication dated Sep. 30, 2004.
EP application-related communication dated Oct. 18, 2004.
Indian application communication dated Feb. 28, 2005.
EP application-related communication dated Jan. 8, 2006.
EP application-related communication dated May 24, 2006.
EPO communication dated Jun. 7, 2006.
EP application-related communication dated Jun. 27, 2006.
Corrected Request for Reexamination for Parent Patent No. 6,510,716.
Decision Granting Request for Reexamination for Parent Patent No. 6,510,716 issued on Mar. 23, 2009.
Complaint for Patent Infringement with Exhibits A-E, *LG Electronics, Inc.* v. *Asko Appliances, Inc. et al.,* C.A. No. 08-828 (JAP), filed Nov. 5, 2008.
Plaintiffs Memorandum in Opposition to Motion to Stay and in Support of Cross-Motion for Preliminary Injunction, *LG Electronics, Inc.* v. *Asko Appliances, Inc. et al.,* C.A. No. 08-828 (JAP), filed May 18, 2009.
Defendants' Reply in Further Support of Motion to Stay Litigation, *LG Electronics, Inc.* v. *Asko Appliances, Inc. et al.,* C.A. No. 08-828 (JAP), filed May 29, 2009.
Declaration in Support of Defendants' Reply with Exhibits 1-5, *LG Electronics, Inc.* v. *Asko Appliances, Inc. et al.,* C.A. No. 08-828 (JAP), filed May 29, 2009.
Order Denying Defendants' Motion for Stay and Dismissing Plaintiff's Motion for Preliminary Injunction, *LG Electronics, Inc.* v. *Asko Appliances, Inc. et al.,* C.A. No. 08-828 (JAP), filed Jun. 17, 2009.
Submission of Third Party filed on Jan. 9, 2009, Opposition for corresponding EP Patent No. 1094144.
U.S. Office Action dated Apr. 19, 2010 for U.S. Appl. No. 11/602,412.
U.S. Notice of Allowance issued in U.S. Appl. No. 11/043,912 dated Apr. 22, 2010.

* cited by examiner

STRUCTURE OF DRIVING UNIT IN DRUM TYPE WASHING MACHINE

Matter enclosed in heavy brackets [ ] appears in the original patent but forms no part of this reissue specification; matter printed in italics indicates the additions made by reissue.

*This application is a Divisional Reissue application of Reissue application Ser. No. 11/043,912, filed Jan. 27, 2005, now U.S. Pat. No. Re. 41,621, which is a Reissue of U.S. Pat. No. 6,510,716. More than one reissue application has been filed for the reissue of U.S. Pat. No. 6,510,716. The Reissue application numbers are Ser. No. 11/043,912 (the parent Reissue application), now U.S. Pat. No. Re. 41,621, Ser. No. 11/602,777 (the present application), and Ser. No. 11/602, 412.*

BACKGROUND OF THE INVENTION

1. Field of the Invention

The present invention relates to a drum type washing machine, and more particularly, to a structure of a driving unit in a drum type washing machine.

2. Background of the Invention

In general, a drum type washing, making washing by using friction between a drum rotated by a motor and laundry in a state detergent, washing water, and the laundry are introduced into the drum, provides effects of beating and rubbing washing, but gives almost no damage to the laundry, and shows no entangling of the laundry. A structure of a related art drum washing machine will be explained with reference to FIG. 1. FIG. 1 illustrates a longitudinal section of a related art drum type washing machine, provided with a tub 2 mounted inside of a cabinet 1, a drum 3 rotatably mounted on a central portion of inside of the tub 2. There is a motor 5a under the tub 2 connected with a pulley 18. There is a drum shaft 25 connected to a rear of the drum 3, to which a drum pulley 19 is coupled. And, the drum pulley 19 on the drum shaft and the motor pulley 18 connected to the motor 5a are connected by a belt 20 for transmission of power. And, there is a door 21 in a front part of the cabinet 1, with a gasket 22 between the door 21 and the tub 2. There is a hanging spring 23 between an inside of an upper portion of the cabinet 1 and an outside of an upper portion of the tub 2, and a friction damper 24 between an inside of a lower portion of the cabinet 1 and a lower side of an outside of the tub 2 for damping vibration of the tub 2 generated during spinning. There is a detergent container 26 in the upper front of the cabinet 1, and in the upper back of the cabinet 1 is a water supply valve 27 for supplying water to the detergent container.

However, the related art washing machine has the following disadvantages since driving power of the motor 5a is transmitted to the drum 3 through the motor pulley 18, and the drum pulley 19, and the belt 20 connecting the motor pulley 18 and the drum pulley 19.

First, there is a loss of energy in a course of driving power transmission because the driving power is transmitted from the motor 5a to the drum 3, not directly, but through the belt 20 wound around the motor pulley 18 and the drum pulley 19.

And, the driving power transmission from the motor 5a to the drum 3, not directly, but through many components, such as the belt 20, the motor pulley 18, and the drum pulley 19, causes much noise in the course of power transmission.

The lots of components required for transmission of driving power from the motor 5a to the drum 3, such as the motor pulley 18, the drum pulley 19 and the belt 20, require many assembly man-hours. And, the more the number of components required for transmission of driving power from the motor 5a to the drum 3, the more number of spots which require repair, and the more frequent at which repair required. The imbalance caused by the motor mounted to a lower part of rear of the tub 2 causes heavy vibration when the motor is rotated. Consequently, there is a weight balancer of metal or cement separately provided to an opposite position of the motor for system balancing.

In summary, the indirect driving power transmission from the motor 5a to the drum 3 through the motor pulley, the drum pulley, and the belt requires many repair, has much noise, waste of energy, and results in a deterioration of a washing capability.

SUMMARY OF THE INVENTION

Accordingly, the present invention is directed to a structure of a driving unit in a drum type washing machine that substantially obviates one or more of the problems due to limitations and disadvantages of the related art.

An object of the present invention is to provide a structure of driving unit in a drum type washing machine, in which the motor is coupled to the drum directly for reducing vibration, and either reducing a weight of the weight balancer or remove the weight balancer completely.

Another object of the present invention is to provide a structure of driving unit in a drum type washing machine, which can reduce waste of energy by employing a BLDC motor that has a good energy efficiency.

Other object of the present invention is to provide a structure of driving unit in a drum type washing machine, which involves no deformation of the rotor even if the rotor rotates at a high speed.

Further object of the present invention is to provide a structure of driving unit in a drum type washing machine, which permits an easy assembly of the drum washing machine.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, as embodied and broadly described, the structure of a driving unit in a drum type washing machine includes a tub for storing washing water, a drum rotatably mounted inside of the tub disposed horizontal to the ground, or with an angle to the ground for accommodating laundry therein, a shaft connected, through the tub, to the drum mounted inside of the tub, for transmission of a driving force of the motor to the drum, bearing fitted each onto an outer circumference of the shaft for supporting the shaft, a bearing housing having stator fastening bosses disposed at fixed intervals along a circumference of a central portion thereof, for supporting the bearings, a stator having a plurality of magnetic cores formed by stacking magnetic laminations, each having a salient pole projected outward and a plurality of coils each wound around a respective one of the salient poles, and a cup formed rotor having a rotor body and permanent magnets, the rotor by comprising a sidewall and a rear wall to cover an outer circumference and a bottom of the stator, the permanent magnets fitted to the side wall, ad a connecter connecting the rotor and the shaft.

Preferably, the salient poles of the stator are projected outward in a radial direction with respect to a central longitudinal axis of the stator. Preferably, the stator further comprises a frame of insulating material for covering top and bottom surfaces of a magnetic core assembly of the magnetic cores. And preferably the stator further comprises a plurality of fastening ribs projected inward, each with a fastening hole for fixing the stator to the bearing housing. More preferably the fastening ribs are projected inward in the radial direction. And more preferably the fastening ribs are formed as one unit with the frame.

Preferably the rotor body is formed of magnetic material such as iron or iron alloy, which enables the side wall of the rotor body to serve as a back yoke that forms a magnetic flux path. Preferably the rear wall of the rotor body is formed as one unit with the sidewall. Preferably the permanent magnets are fitted to a setting surface of an "L" formed bent portion of the side wall.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
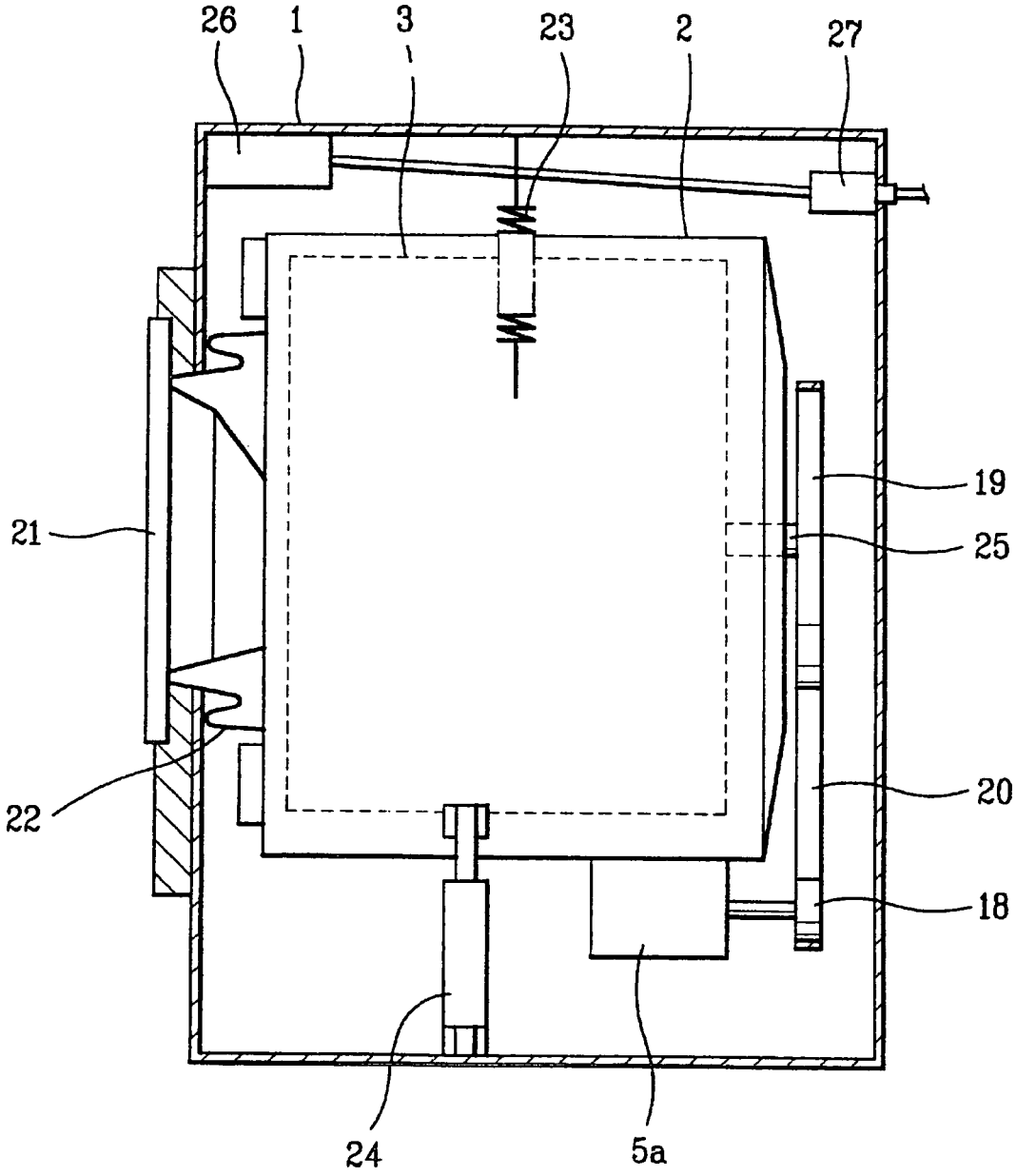
FIG. 1 RELATED ART
FIG. 1 illustrates a longitudinal section of a related art drum type washing machine.
Figure 2A:
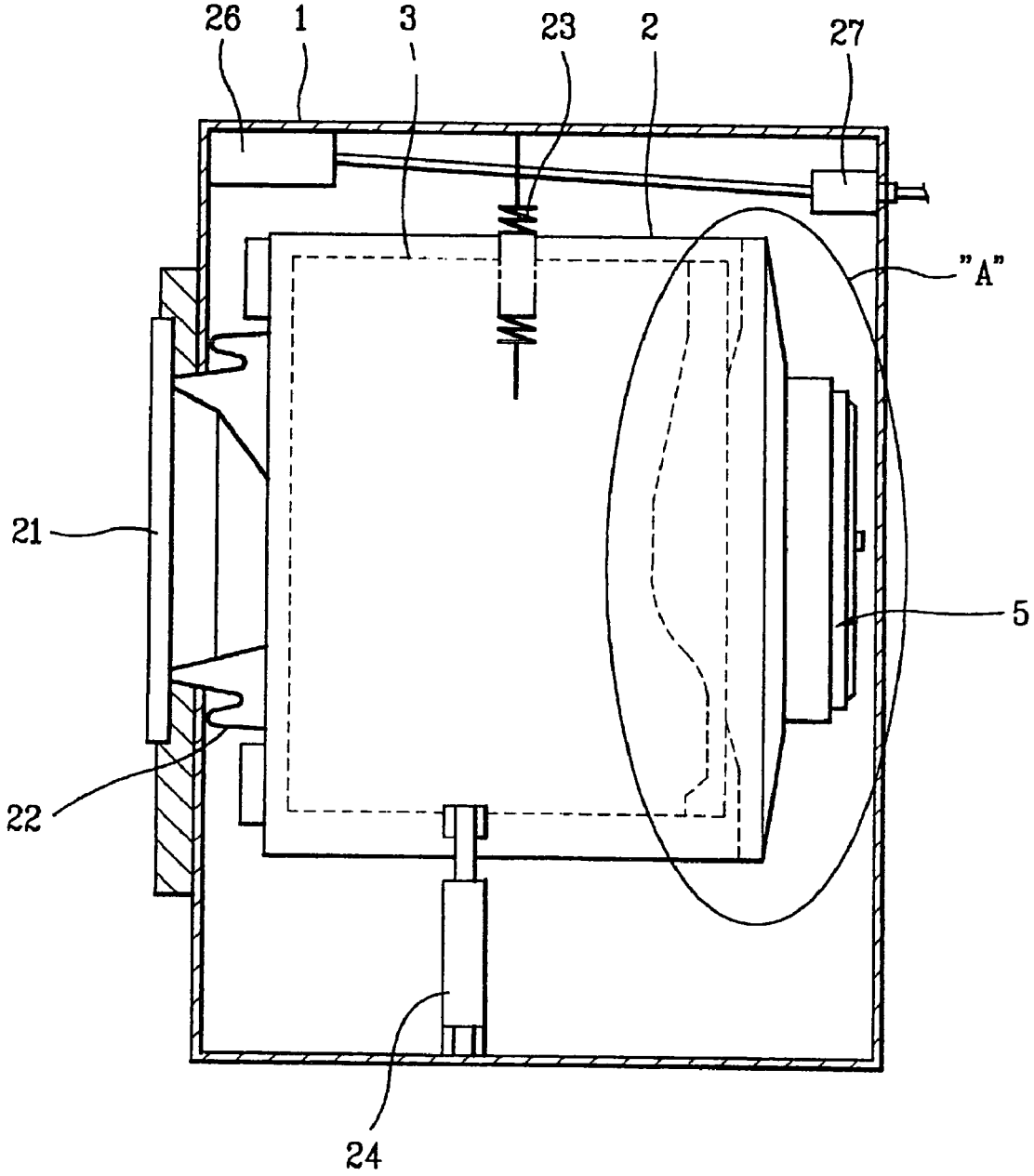
FIG. 2A illustrates a longitudinal section of a drum type washing machine in accordance with a first preferred embodiment of the present invention.
Figure 7:
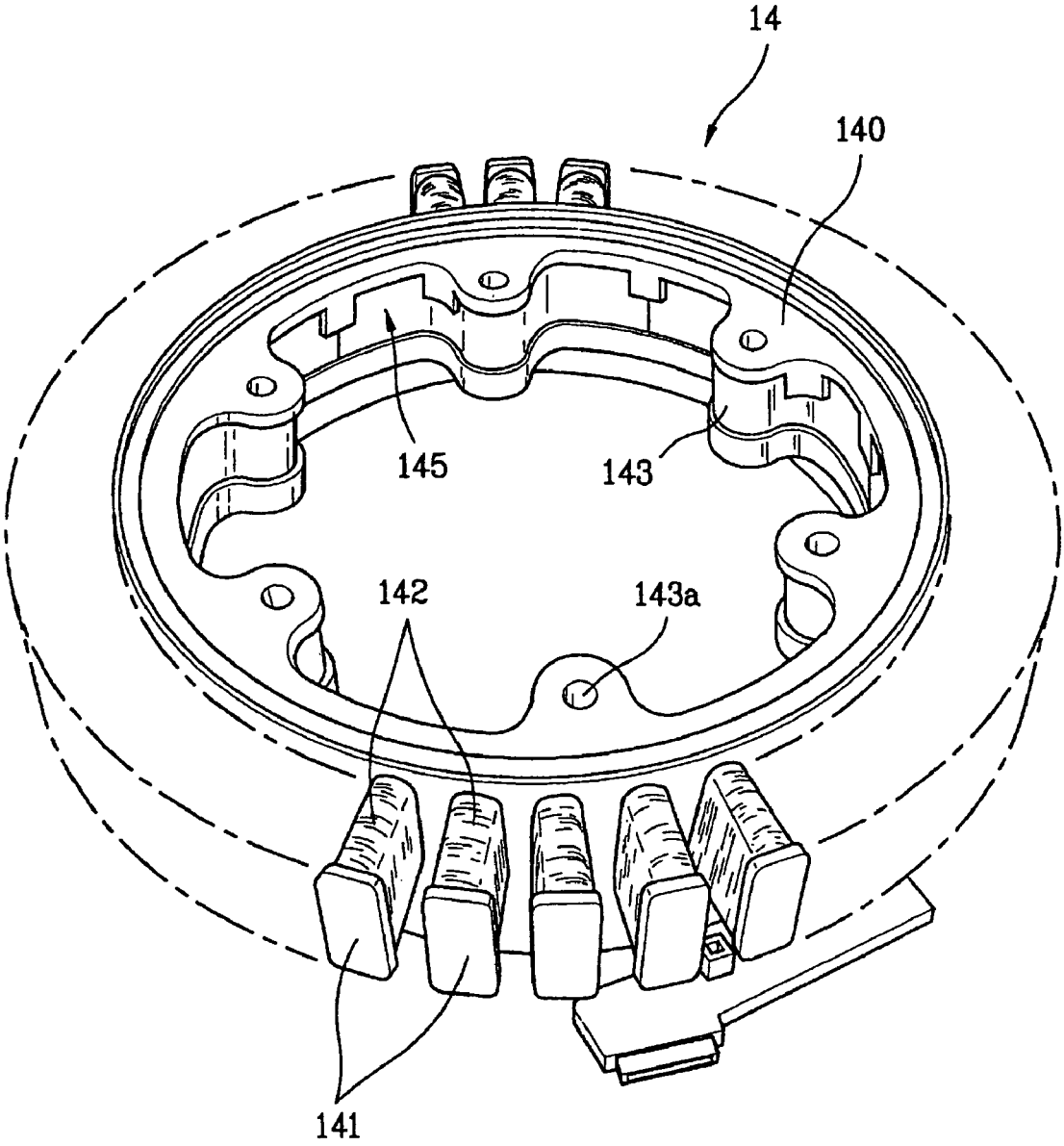
FIG. 7 illustrates a perspective view of the stator in FIG. 2.
Figure 8:
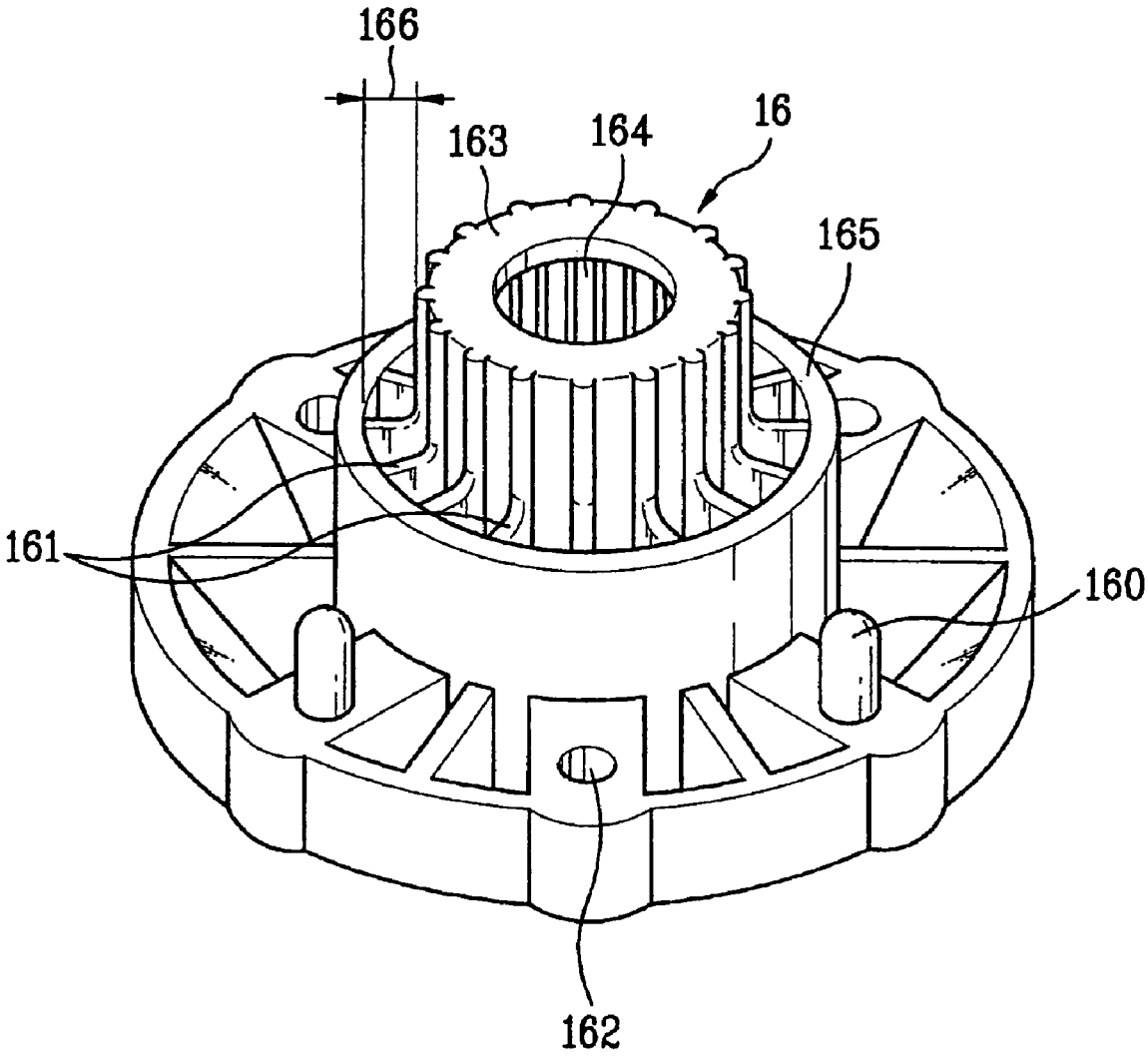
FIG. 8 illustrates a perspective view of the connector in FIG. 2.
Figure 9:
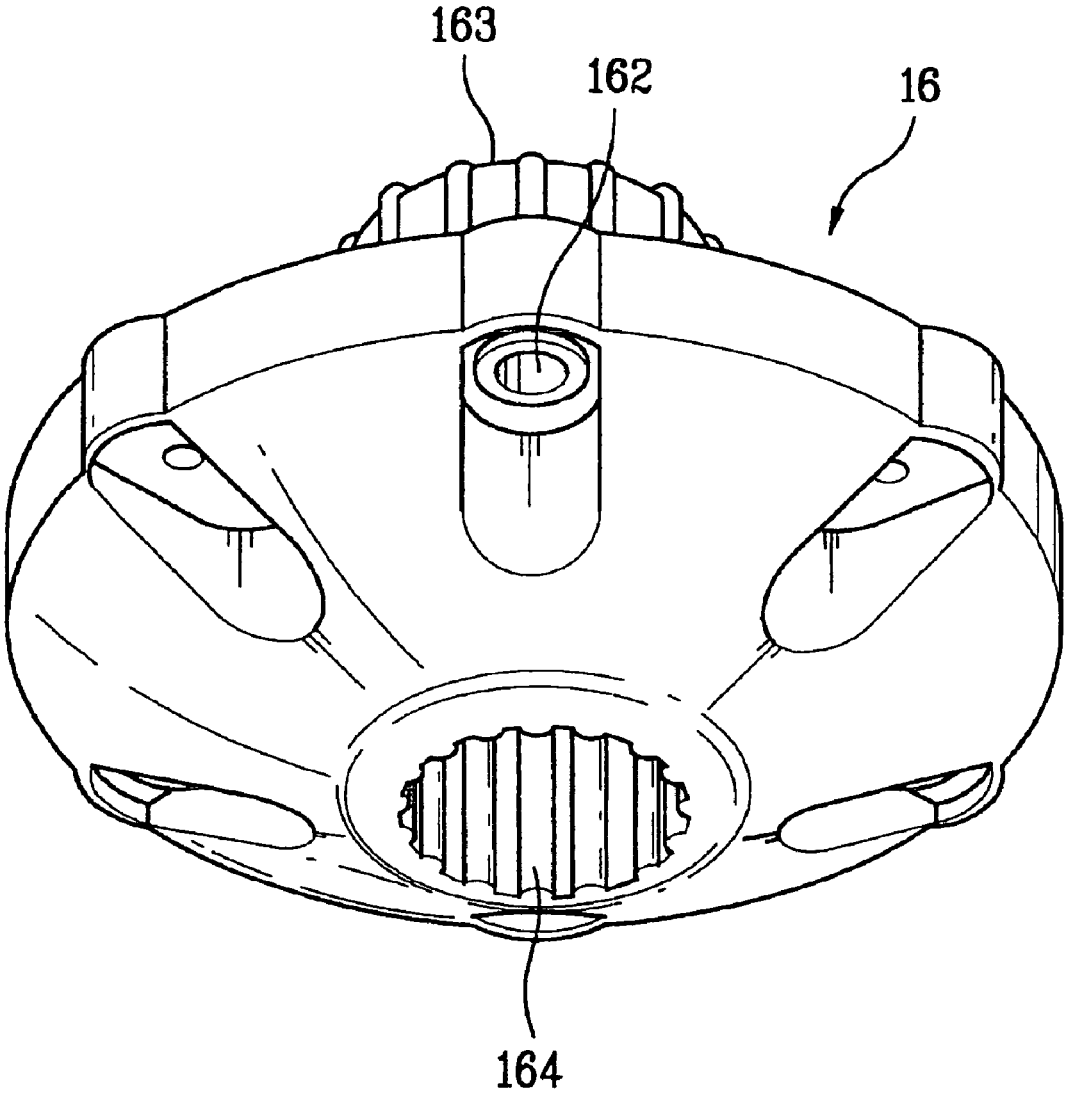
FIG. 9 illustrates a perspective view of a bottom of FIG. 8.

Reference will now be made in detail to the preferred embodiments of the present invention, examples of which are illustrated in the accompanying drawings. A drum type washing machine in accordance with a first preferred embodiment of the present invention will be explained with reference to FIGS. 2A-9. FIG. 2A illustrates a longitudinal section of a drum type washing machine in accordance with a first preferred embodiment of the present invention, FIG. 2B illustrates a detailed enlarged view of "A" part in FIG. 2A, FIG. 2C illustrates a detailed enlarged view of "B" part in FIG. 2B, FIG. 3 illustrates a right side view of FIG. 2B having a motor removed therefrom, FIG. 4 illustrates a perspective view showing the rotor in FIGS. 2A-2C with a partial cut away view, FIG. 5 illustrates an enlarged perspective view of "C" part in FIG. 4, FIG. 6 illustrates a perspective view of a bottom of FIG. 4, FIG. 7 illustrates a perspective view of the stator in FIG. 2, FIG. 8 illustrates a perspective view of the connector in FIG. 2, and FIG. 9 illustrates a perspective view of a bottom of FIG. 8.

Figure 2B:
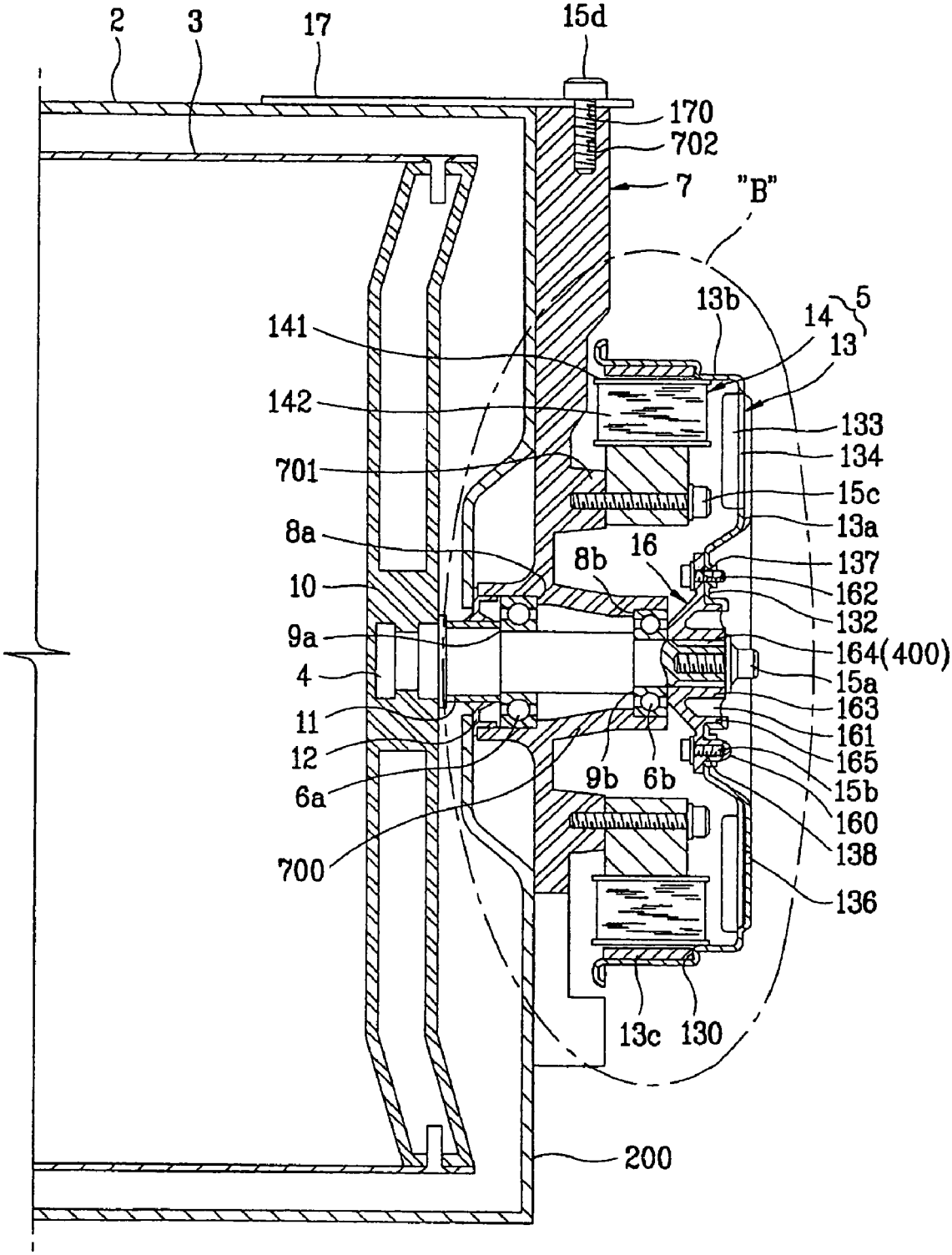
FIG. 2B illustrates a detailed enlarged view of "A" part in FIG. 2A.
Figure 2C:
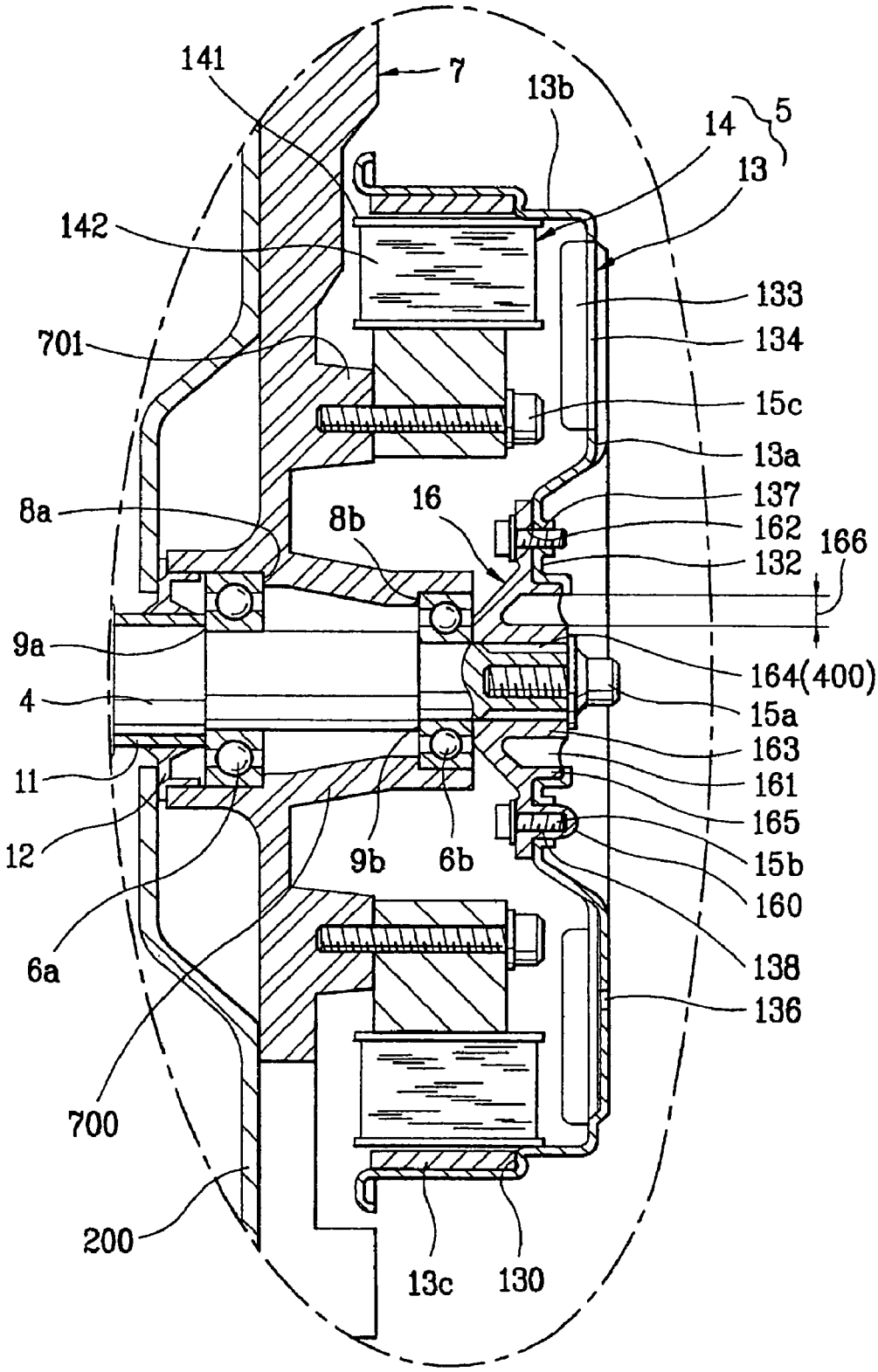
FIG. 2C illustrates a detailed enlarged view of "B" part in FIG. 2B.
Figure 3:
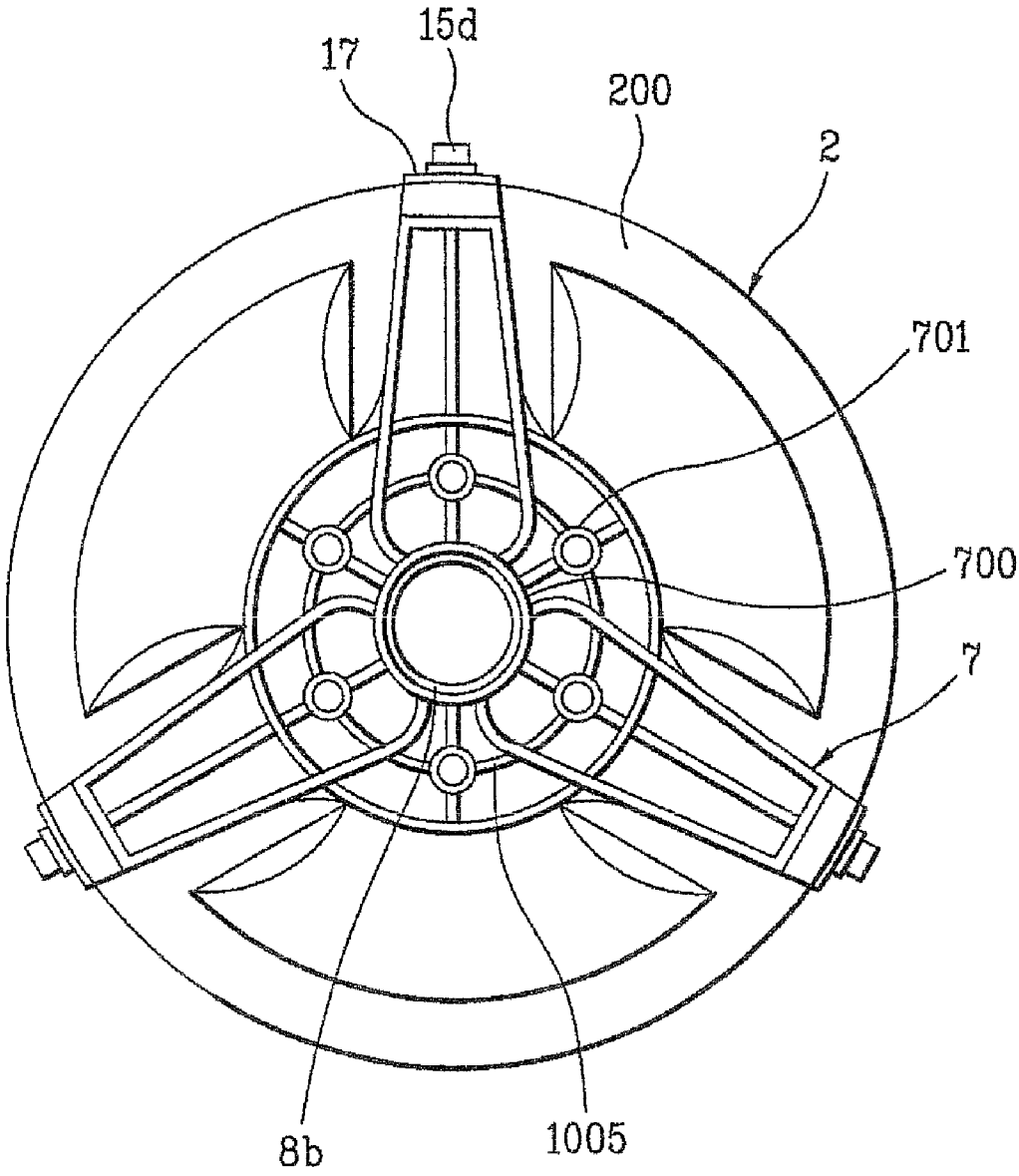
FIG. 3 illustrates a right side view of FIG. 2B having a motor removed therefrom.

Referring to FIGS. 2A and 2B, the drum type washing machine in accordance with a first preferred embodiment of the present invention includes a tub 2 of a metal inside of a cabinet (not shown) for storage of water, a drum 3 inside of the tub 2, a shaft 4 connected to the drum 3 for transmission of a driving force from a motor 5 to the drum 3, a front bearing 6a and a rear bearing 6b respectively fitted to outer circumferences of both ends of the shaft 4, a bearing housing 7 mounted to a rear wall 200 of the tub 2 for supporting the front and rear bearings, a rotor 13 mounted to a rear end of the shaft 4 to form a motor 5 together with a stator, the stator 14 on an inner side of the rotor 13 mounted to a rear wall 200 of the tub to form the motor together with the rotor, and a connector 16 serration coupled to the shaft 4 at a rear side of the rear bearing 6b and fastened to the rotor 13 for transmission of a rotating force from the rotor to the shaft 4. The bearing housing 7 is formed of a metal, preferably aluminum alloy. There is a hub 700 formed as one unit with the bearing housing 7 at a center thereof for fitting the front and rear bearings therein, and fastening bosses 701 formed on an outer side of the hub 700 at fixed intervals along a circumference for fastening the stator 14 to the bearing housing 7 with fastening members 15d such that the bearing housing 7 looks like a semipalmate tripod in overall as shown in FIG. 3. *A circular reinforcing rib 1005 connects the stator fastening bosses 701, as shown in FIG. 3.* In this instance, there is a step 8a and 8b formed in an inside circumference of the hub 700 on a central portion of the bearing housing 7 at each end of the hub 700 for supporting the front bearing 6a and the rear bearing 6b so that respective bearings do not fall off, but are held therein. The step 8a in the front has a form of "⌉" for holding a rear end of the front bearing 6a, and the step 8b in the rear has a form of "⌊" for holding a front end of the rear bearing 6b. And, there are positioning steps 9a and 9b at front and rear circumferences of the shaft 4 for positioning the front bearing 6a and the rear bearing 6b on the shaft 4, respectively. The shaft 4 has a fore end held in a spider 10 in the rear wall of the drum 3, an exposed portion from a rear end of the spider 10 to the front bearing 6a having a bushing 11 of brass press fit thereon for prevention of rusting, with a sealing member 12 fitted on an outer circumference thereof for prevention of ingress of water, and a rear end having the rotor 13 of a direct coupling type motor 5 mounted on a center thereof. In this instance, a crown formed stator 14 is positioned on an inner side of the rotor 13, fastened to the fastening bosses 701 on the bearing housing 7 to form the direct coupling type motor in combination with the rotor 13.

Figure 4:
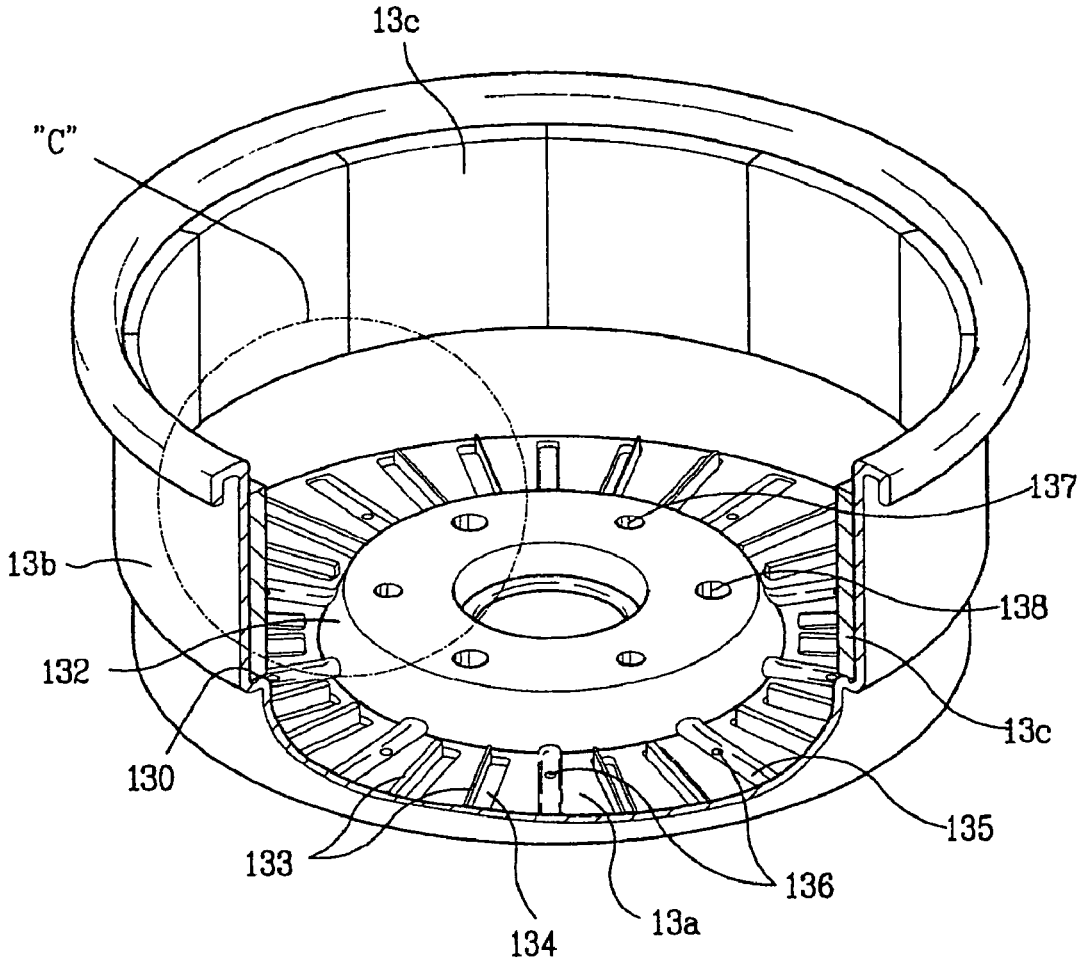
FIG. 4 illustrates a perspective view showing the rotor in FIGS. 2A~2C with a partial cut away view.
Figure 5:
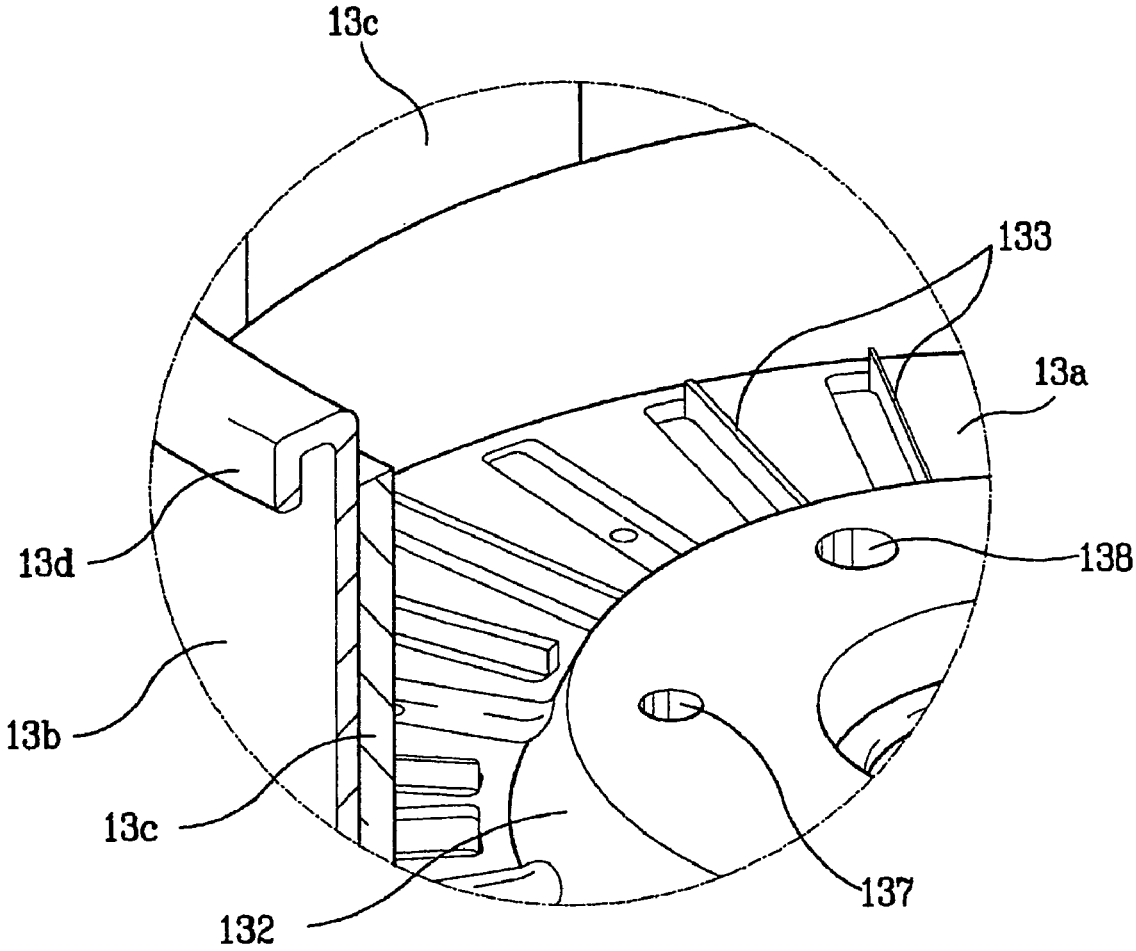
FIG. 5 illustrates an enlarged perspective view of "C" part in FIG. 4.
Figure 6:
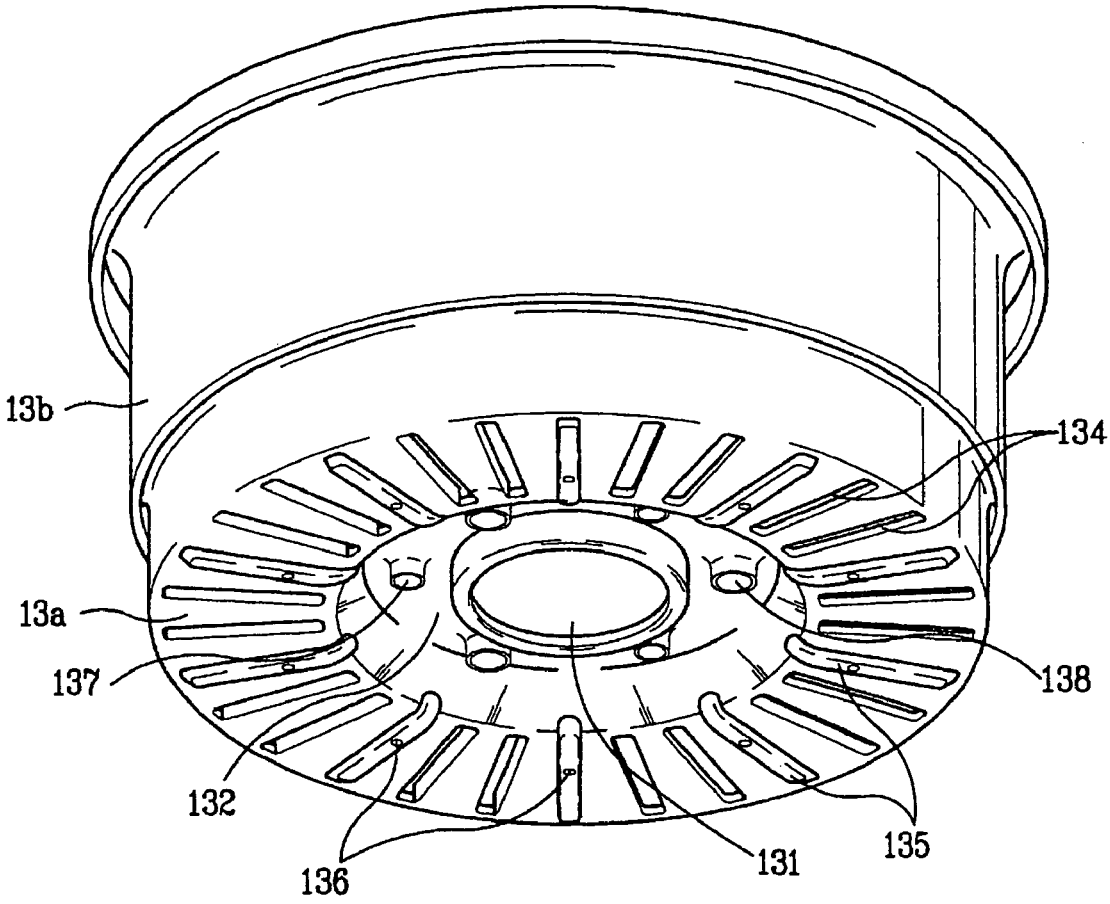
FIG. 6 illustrates a perspective view of a bottom of FIG. 4.

In the meantime, referring to FIGS. 4 to 6, the rotor 13, formed of a magnetic material, such as iron or iron alloy, has a rear wall 13a, a side wall 13b, and permanent magnets 13c provided on the side wall. The side wall 13b extending from a periphery of the rear wall 13a and serving as a back yoke that forms a magnetic flux path comprises a magnet setting surface 130, a bent portion formed along a circumference thereof for supporting magnets 13c fitted to an inside surface thereof and for reinforcing the rotor 13. And, there is a hub 132 at a center of the rear wall 13a having a through hole 131 for passing of a fastening member 15a for preventing fall off of the shaft 4 from the connector 16 fixed to the rotor 13 from the shaft 4. The rotor 13 is preferably formed by pressing. That is, the rotor 13 is formed by pressing as a unit both with the side wall 13b having the magnet setting surface and the rear wall 13a serving as a frame for supporting the side wall, without any separate additional fabrication process.

In general, the drum washing machine may cause a problem of temperature rise owing to a load since the drum and laundry should be run fast together. Therefore, there are a plurality of cooling fins around the hub 132 of the rotor 13 as a unit with the rotor 13 in a radial direction for blowing air toward the stator 14 in rotation of the rotor 13 to cool down a heat generated at the stator 14. Each of the cooling fins 133 has a length in the radial direction. The cooling fin 133 is formed by lancing, to be bent at approx. 90° from the rear wall 13a to direct toward opening, to form an opening 134 which serves as a vent hole. Accordingly, formation of the cooling fin 133 and formation of the vent hole are done by one process, different from a case when the formation of the vent hole is done by punching, thereby permitting saving in material and working hours as no separate component and process for forming the cooling fin is required.

And, different from BLDC motors used in VCR(Video Cassette Recorder) and the like, since the BLDC motor employed in the washing machine runs fast under a great load, a shape of the rotor is liable to deform during rotation of the rotor, which causes a non-uniform gap between the rotor and the stator. In order to eliminate this problem, there is an embossing 135 between every adjacent cooling fins 133 for reinforcing the rotor 13 together with the foregoing setting surface 130. Moreover, there is a channel sectioned rim 13d at an end of the rotor for stiffening the end for maintaining a true circle even if the rotor 13 rotates at a high speed. And, there is a draining hole 136 in the embossing 135 for discharge of water. And, there are fastening holes 137 for fastening the connector 16 serration coupled to an outer circumference of the shaft 4 at a rear end thereof exposed at a rear of the rear bearing 6b and the positioning holes 138 for fixing a position of assembly of the connector 16, both of which are formed around the through hole 131 in the hub 132 of the rotor 13 at fixed intervals. The connector 16 is formed of a resin which has a vibration mode different from the body of the rotor 13 of iron or iron alloy, for attenuating a vibration occurred in rotation of the drum. The fastening hole 137 and the positioning hole 138 in the connector 16 have diameters different from each other.

Referring to FIGS. 2,8 and 9, the connector 16 has fastening holes 162 in correspondence to the fastening holes in the hub 132 of the rotor 13 along a circumference of a periphery thereof, and positioning projections between adjacent fastening holes 162 for automatic match between the fastening holes 137 in the rotor 13 and the fastening holes 162 in the connector 16 as the positioning projections 160 are inserted into the positioning holes 138 in the connector 13. And, there is serration 164 in an inside circumference of the hub 163 of the connector 16 matched to the serration 400 in the rear end of the shaft 4, and there are reinforcing ribs 161 on an outer side of the hub 163 of the connector 16 for reinforcing the hub 163.

Referring to FIGS. 2 and 7, the stator 14, forming the motor 5 together with the rotor 13, includes a plurality of magnetic cores 145 formed by stacking magnetic laminations and each having a salient pole 141 projected outward in a radial direction, coils 142 wound around the salient poles 141, a frame 140 of insulating material for covering top and bottom surfaces of a magnetic core assembly of the magnetic cores 145, and fastening ribs 143 with fastening holes 143a for fixing the stator 14 to the bearing housing 7, the fastening ribs 143 formed as one unit with the frame 140 and projected inward in a radial direction.

There are tub brackets 17 welded to an outer circumference of the tub 2 for fixing the bearing housing 7 at a rear portion of the tub, and fastening holes 170 at rear ends of the tub brackets 17 for passing of fastening members 15d fastened to the fastening holes 702 formed in an end portion of the bearing housing 7 in a radial direction.

The operation of the aforementioned structure of a driving unit in a drum type washing machine in accordance with a first preferred embodiment of the present invention will be explained.

Upon rotation of the rotor 13 as a current flows to the coils 142 of the stator 14 in a sequence under the control of a motor driving controller in a panel part(not shown), the shaft 4 serration coupled to the connector 16 which is in turn connected to the rotor is rotated, to rotate the drum 3 as a power is transmitted to the drum through the shaft 4.

The assembly process of the first embodiment structure of a driving unit in a drum type washing machine of the present invention will be explained.

First, the drum 3 is placed inside of the tub 2. In this instance, the bushing 11 is press fit on an exposed portion of the shaft from rear of the spider 10 to the front bearing 6a for prevention of rusting of the shaft, and the sealing member 12 is fitted on the bushing 11 for prevention of ingress of water toward the bearing. Then, the front bearing 6a is inserted on the shaft 4 in a state the drum 3 is placed inside of the tub 2. After insertion of the front bearing 6a, the bearing housing 7 is fixed to the rear of the tub as the fastening member 15d passes through the fastening hole 170 in the tub bracket 17 welded to outer circumference of the tub 2 and fastened to the fastening hole 702 in the bearing housing 7. After completion of mounting of the bearing housing 7 to the tub 2, the rear bearing 6b is fitted to the rear end of the shaft 4. In this instance, the rear bearing 6b is held at the step 9b in rear portion of the shaft 4 and the step 8b inside of the bearing housing 7 at an end thereof. In this condition, after the fastening holes 143a in the fastening ribs 143 of the stator are aligned with the fastening bosses 701 on the bearing housing 7 on the outer side of the hub 700 at fixed intervals along a circumference, the stator is fastened to the fastening bosses 701 with the fastening members 15c, to fix the stator 14 to the bearing housing 7, firmly. Then, after an assembly of the rotor 13 and the connector 16, which assembly is done separately, is inserted onto the rear end of the shaft 4, the fastening member 15a is fastened, to prevent the connector 16 from falling off the shaft by a fastening force of the fastening member 15a.

The assembly process of the rotor 13 and the connector 16 will be explained.

First, the positioning holes 138 in the rotor 13 and the positioning projections 160 on the connector 16 are aligned, and the positioning projections 160 on the connector 16 are inserted into the positioning holes 138 in the rotor 13. In this temporary assembly when the positioning projections 160 on the connector 16 are merely inserted into the positioning holes 138 in the rotor 13, the fastening holes 137 in the rotor 13 and the fastening holes 162 in the connector 16 are aligned, under which condition, the fastening members 15b are fastened through the fastening holes 137 and 162, to assemble the rotor 13 and the connector 16 together.

The operation of the structure of a driving unit in a drum type washing machine of the first preferred embodiment of the present invention assembled thus will be explained.

The bearing housing 7 of a metal, such as aluminum alloy, is applicable to the drum type washing machine which has a drying cycle since the bearing housing 7 shows no thermal deformation even at a high temperature. The "]" formed step 8a in the front, and the "[" formed step 8b in the rear of the inside circumference of the bearing housing 7 hold a rear end of the front bearing 6a and a front end of the rear bearing 6b fitted on outer circumferences of the shaft 4 at both ends thereof, respectively. The positioning steps 9a and 9b in outer circumferences of a front portion and a rear portion of the shaft 4 permit to fix positions of the front bearing 6a and the rear bearing 6b with respect to the shaft 4. In the meantime, the front end of the shaft 4 is fixed in the spider 10 mounted to a rear wall of the drum 3, the exposed portion of the shaft from rear of the spider 10 to the front bearing 6a has the bushing 11 press fit thereon for prevention of rusting of the shaft, and the sealing member 12 is fitted on the bushing 11 for prevention of ingress of water toward the bearing. The fastening bosses 701 on the bearing housing 7 on the outer side of the hub 700 at fixed intervals along a circumference permits the stator 14 to be fastened to the fastening bosses 701 with the fastening members 15c, to fix the stator 14 to the bearing housing 7, firmly. And, the rotor 13 of the direct coupling type motor 5 is fixed to the rear end of the shaft 4, and the bent part having the magnet setting surface 30 formed along a circumference of the sidewall 13b extended forward from a periphery of the rear wall 13a of the rotor 13 supports the magnets 13c attached to the rotor 13, thereby permitting an easy fabrication of the rotor. The through hole 131 in the hub 132 at a center of the rear wall 13a of the rotor 13 permits to fasten the fastening members 15a, such as bolts, to the rear end of the shaft for prevention of falling of the shaft 4 off the rotor 13 and the connector 16 coupled to the rotor 13, and the plurality of cooling fins 133 formed around the hub 132 of the rotor 13 in a radial direction each with a length blow air toward the stator 14 when the rotor 13 is rotated, thereby cooling down the heat generated at the stator 14. The cooling fin 133 formed to direct the open side of the rotor 13 by lancing forms the through hole 134 which serves as a vent hole. The body of the rotor 13 formed of iron or iron alloy by pressing reduces a fabrication time period very much, to improve a productivity of the rotor. The embossing 135 between adjacent cooling fins 133 on the rear wall 13a of the rotor improve an overall strength of the rotor 13, and the draining hole 136 in the embossing 135 permits to discharge water. The fastening holes 137 for fastening the connector and the positioning holes 138 for fixing a position of assembly of the connector 16, both of which are formed around the through hole 131 in the hub 132 of the rotor 13 permits to assemble the connector 16, serration coupled to the rear end of the shaft 4 exposed in rear of the rear bearing 6b, and the rotor 13 with easy. Once the positioning projections on the connector 16 are aligned with the positioning holes 138 in the rotor 13, the fastening holes 137 and 162 in both of the rotor 13 and the connector 16 are aligned automatically, through which the fastening members 15b are fastened, to assemble the connector 16 and the rotor 13 with easy. In this instance, the connector 16 of a resin injection molding has a vibration mode different from the same of the rotor 13 of iron or iron alloy, to attenuate the vibration from the rotor 13 to the shaft 4. The serration 164 on an inside circumference of the hub 163 of the connector 16 is fitted to the serration 400 on the rear end of the shaft 4, to transmit a rotation force from the rotor 13 to the shaft 4 as it is. There is a cylindrical outer rib 165 spaced from the outer circumference of the hub 163, an end of which is brought into close contact with the rotor for being held, firmly. A space 166 formed between the hub 163 and the outer rib 165 cuts off transmission of vibration from the shaft to the rotor or vice versa. The reinforcing ribs 161 in the space 166 connecting the hub 163 and the outer ribs 167 permits an overall strength of the connector 16 to be adequate.

Figure 10:
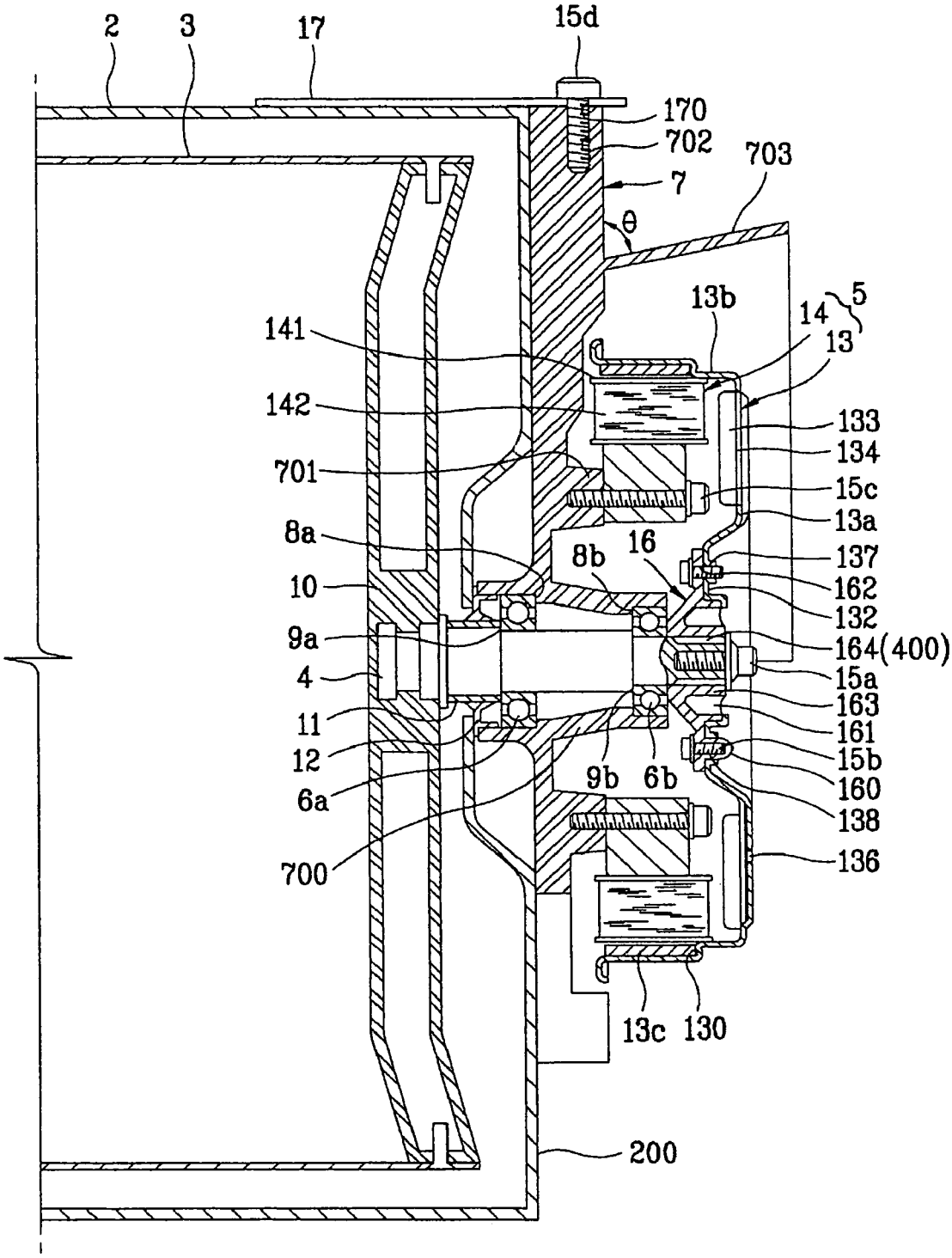
FIG. 10 illustrates a longitudinal section of key parts of a structure of a driving unit in a drum type washing machine in accordance with a second preferred embodiment of the present invention.
Figure 11:
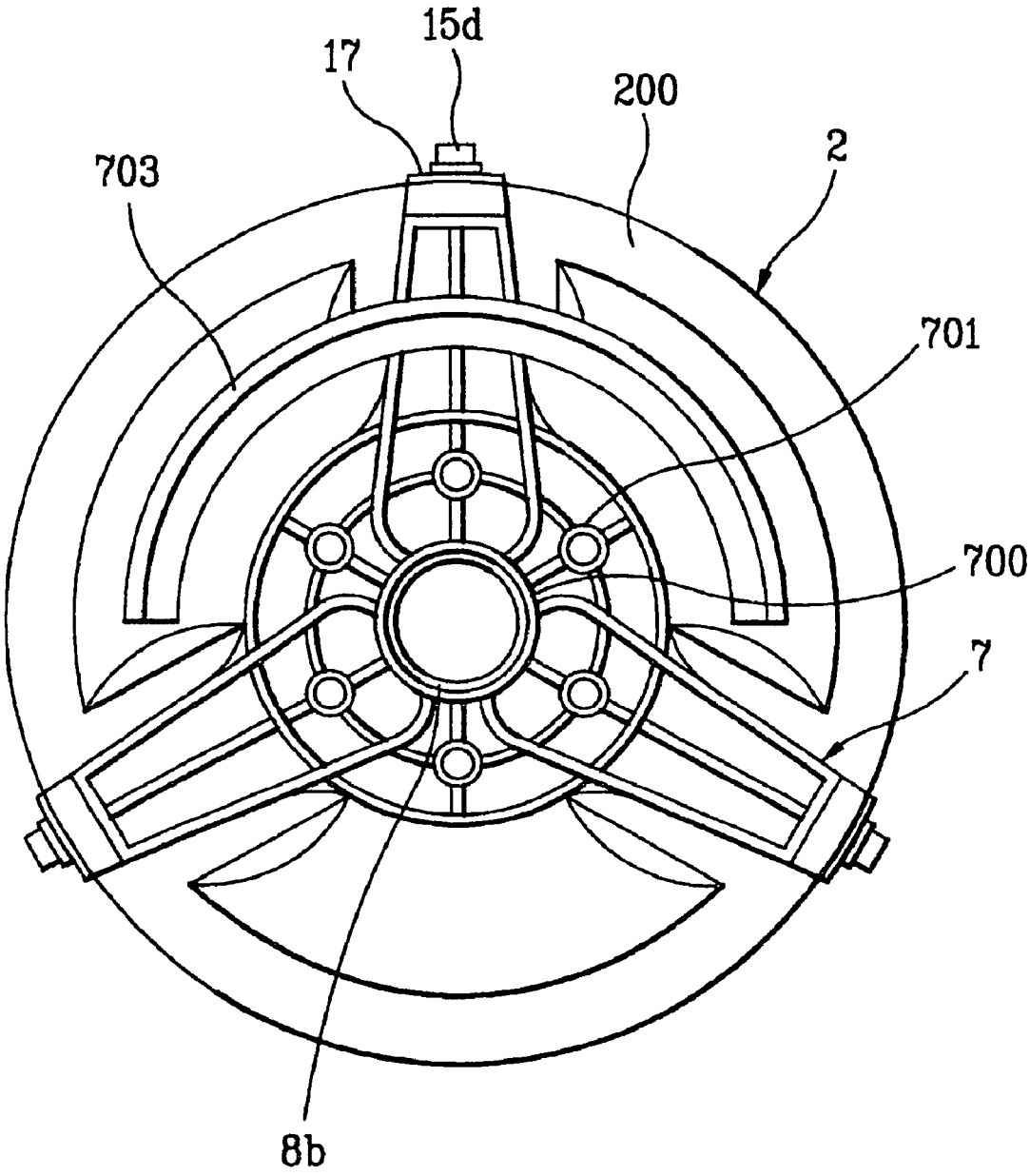
FIG. 11 illustrates a right side view of FIG. 10 having a motor removed therefrom.

A structure of a driving unit in a drum type washing machine in accordance with a second preferred embodiment of the present invention will be explained with reference to FIGS. 10 and 11. FIG. 10 illustrates a longitudinal section of key parts of a structure of a driving unit in a drum type washing machine in accordance with a second preferred embodiment of the present invention, and FIG. 11 illustrates a right side view of FIG. 10 having a motor removed therefrom. Second embodiment components identical to the first embodiment will be given the same reference symbols, and explanations of which will be omitted. The second embodiment structure of a driving unit in a drum type washing machine of the present invention further includes [an] *a skirt or* arc formed baffle 703 on an upper portion of outer side of the rotor 13 mounted to the bearing housing 7 for prevention of ingress of water into a motor 5, which water is dropped from a water supply valve 27 when the water supply valve 27 is out of order. The arc formed baffle 703 has a length connecting both ends of the arc greater than a diameter of the rotor 13. Provided that the baffle 703 is formed to have a length enough to project an end thereof beyond a rear of the sidewall 13b of the rotor, though it does not matter that an angle θ between the rear wall 200 of the tub and a top surface of the baffle 703 is 90° or greater than 90°, it is preferable that the angle θ μs smaller than 90°.

The operation of the aforementioned structure of a driving unit in a drum type washing machine in accordance with a second preferred embodiment of the present invention will be explained.

In the related art, since the motor 5a is mounted to a lower portion of the tub 2, chances are low that water will invade into the motor 5a even if water drops leak from the water supply valve 25. But in a drum type washing machine with the structure of a driving unit of the present invention, since the motor 5 is mounted to a rear of the tub 2, if the water supply valve 27 gets out of order and water leaks, the leaking water is liable to fall toward the motor 5 an invade into it, which should be prevented. In order to prevent this in the present invention, the arc formed baffle 703 is provided to surround the rotor from an outer upper side of the rotor in the bearing housing 7 for prevention of the water flow toward the motor 5, thereby securing a reliability of the motor without shifting a position of the water supply valve 27. It is preferable that the angle θ between the rear wall 200 of the tub 2 and the top surface of the baffle 703 is less than 90° so that the water flows on the rear wall, but the angle θ does not matter as far as a length of the baffle 703 from a fixed end to a free end is enough to cover the sidewall 13b of the rotor.

Figure 12:
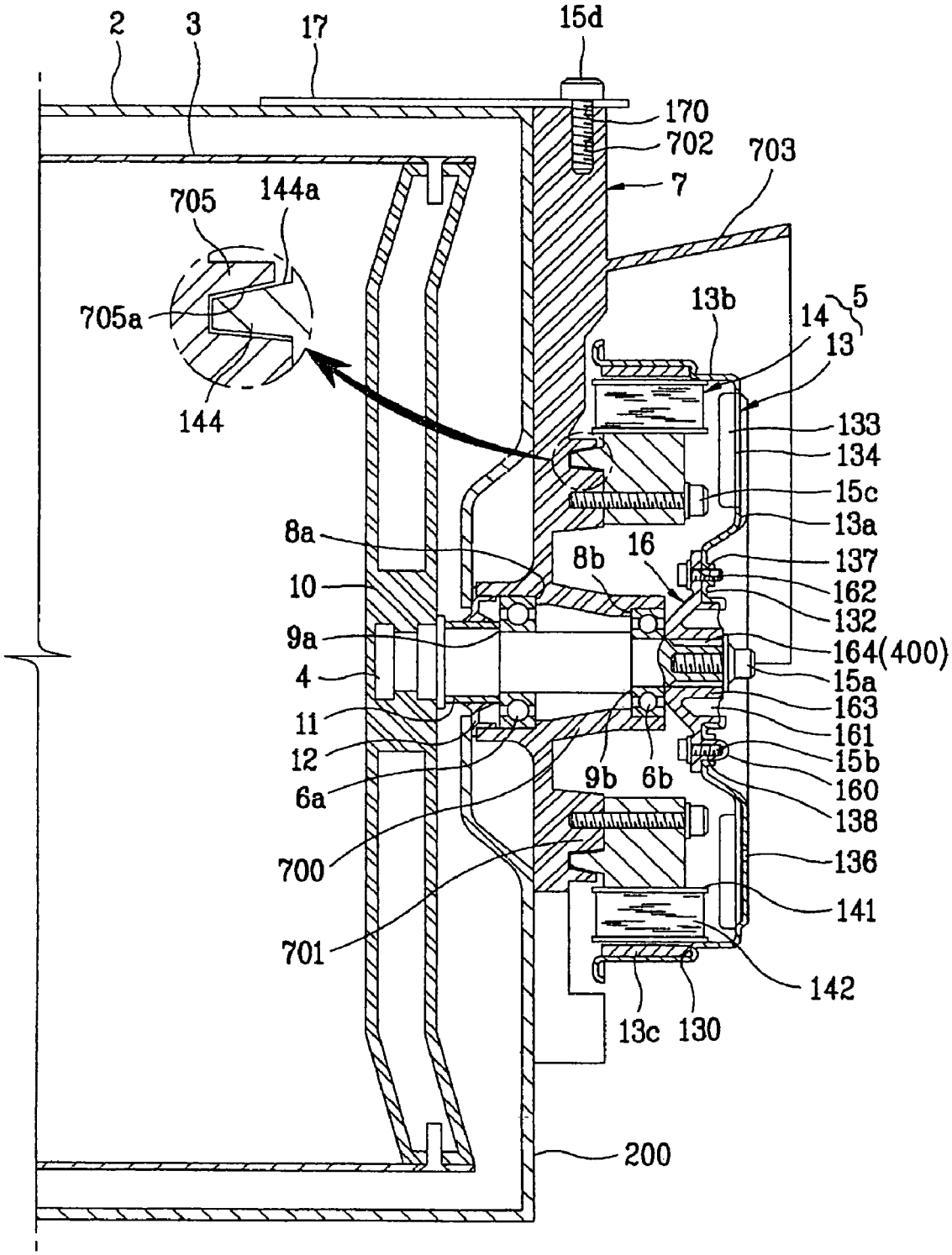
FIG. 12 illustrates a longitudinal section of key parts of a structure of a driving unit in a drum type washing machine in accordance with a third preferred embodiment of the present invention; and, FIG. 13 illustrates a longitudinal section of key parts of a structure of a driving unit in a drum type washing machine in accordance with a second preferred embodiment of the present invention.

A structure of a driving unit in a drum type washing machine in accordance with a third preferred embodiment of the present invention will be explained with reference to FIG. 12. FIG. 12 illustrates a longitudinal section of key parts of a structure of a driving unit in a drum type washing machine in accordance with a third preferred embodiment of the present invention. Third embodiment components identical to the first or second embodiment will be given the same reference symbols, and explanations of which will be omitted.

Referring to FIG. 12, the structure of a driving unit in a drum type washing machine in accordance with a third preferred embodiment of the present invention further includes a *ring-shaped,* self aligning type rib 705 having a slope 705a at one side thereof formed in the bearing housing 7 along a circumference on an outer side of the fastening boss 701, and a *ring-shaped,* self aligning type rib 144 having a slope 144a in correspondence to the slope 705a in the self aligning type rib 705 on an inner side of a frame 140 of the stator 14.

The operation of the aforementioned structure of a driving unit in a drum type washing machine in accordance with a third preferred embodiment of the present invention will be explained.

The self aligning type rib 705 having a slope 705a at one side thereof formed in the bearing housing 7 along a circumference on an outer side of the fastening boss 701, and the self aligning type rib 144 having a slope 144a in correspondence to the slope 705a in the self aligning type rib 705 on an inner side of a frame 140 of the stator 14 permits self alignment of the stator 14 with the hub 700 on the bearing housing 7 on an exact concentric circles in assembly, thereby permitting an easy assembly of the stator to the bearing housing.

Figure 13:
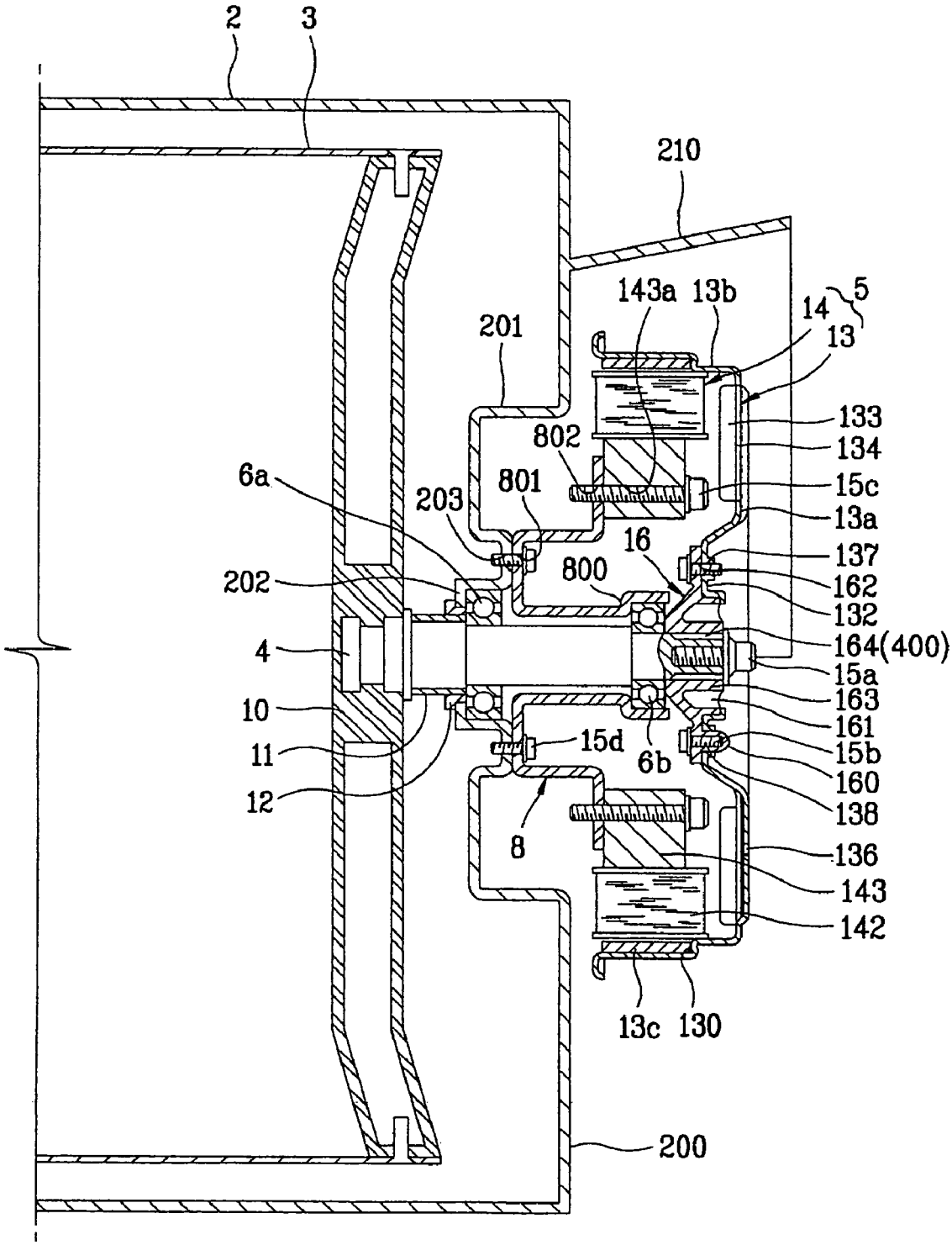

A structure of a driving unit in a drum type washing machine in accordance with a fourth preferred embodiment of the present invention will be explained with reference to FIG. 13. FIG. 13 illustrates a longitudinal section of key parts of a structure of a driving unit in a drum type washing machine in accordance with a second preferred embodiment of the present invention.

Referring to FIG. 13, the structure of a driving unit in a drum type washing machine in accordance with a fourth preferred embodiment of the present invention includes a tub 2 having a hub 201 projected forward from a central portion of a rear wall 200 inside of a cabinet(not shown) for storage of water, a drum 3 inside of the tub 2, a shaft 4 connected to the drum 3 for transmission of a driving force from a motor 5 to the drum 3, a front bearing 6a and a rear bearing 6b respectively fitted to outer circumferences of both ends of the shaft 4, a supporting bracket 8 fastened to one side of the hub 201 of the tub 2 by fastening members 15d passed through fastening holes 801 having a step 800 for supporting the rear bearing 6b and fastening holes 802 for mounting the stator thereon, a connector 16 serration coupled to a rear end of the shaft 4, a rotor 13 of the motor 5 together with the stator coupled to the connector 16, and the stator 14 of the motor together with the rotor 13 fastened to the rear wall 200 of the tub on an inner side of the rotor 13. The bracket 8 is preferably formed of a metal, such as an aluminum alloy. There is a step 202 at an inside end of the hub 201 of the tub 2 for holding a front end of the front bearing 6a fitted on an outer circumference of the shaft 4 at a front end thereof. And, the step 800 at an inside end of the supporting bracket 8 holds a front end of the rear bearing 6b fitted on an outer circumference of the shaft 4 at a rear end thereof. In the meantime, the shaft 4 inside of the supporting bracket 8 for transmission of a driving force from the motor 5 has positioning steps 9a and 9b in an outer circumferences of a front end and a rear end thereof for fixing positions of the front bearing 6a and the rear bearing 6b with respect to the shaft 4, a front end fixed to a spider 10 provided to the rear wall of the drum 3, an exposed portion from a rear end of the spider 10 to the front bearing 6a having a bushing 11 of brass press fit thereon for prevention of rusting, with a sealing member 12 fitted on an outer circumference thereof for prevention of ingress of water, and a rear end having a fastening member 15a fastened to a center for preventing the connector for connection with the rotor 13 of the direct coupling type motor 5 from falling off. The stator 14 of the direct coupling type motor is positioned on an inner side of the rotor 13 and fastened to the fastening holes 801 in the supporting bracket 8. And, there is a arc formed baffle 210 on an upper portion of the rear wall of the tub 2 for prevention of water flow into the motor 5 dropped from the water supply valve when the water supply valve 25 is out of order. The arc formed baffle 210 has a length connecting both ends of the baffle greater than a diameter of the rotor. Provided that the baffle 210 is formed to have a length enough to project an end thereof beyond a rear of the sidewall 13b of the rotor, though it does not matter that an angle θ between the rear wall 200 of the tub and a top surface of the baffle 210 is 90° or greater than 90°, it is preferable that the angle θ is smaller than 90°.

Since the rotor, stator, connector, and the baffle have structures identical to the first and second embodiments, explanations of which will be omitted.

The operation of the structure of a driving unit in a drum type washing machine in accordance with a fourth preferred embodiment of the present invention will be explained.

When the rotor 13 is rotated as a current flows to the coils 142 of the stator 14 in a sequence under the control of a motor driving controller on a panel part(not shown), the shaft 4, serration coupled to the connector 16 which is in turn connected to the rotor, is rotated, to rotate the drum 3 as a power is transmitted to the drum through the shaft 4.

The assembly process of the fourth embodiment structure of a driving unit in a drum type washing machine of the present invention will be explained.

First, the front bearing 6a is inserted onto the shaft 4 in a condition the drum 3 having the shaft 4 fixed to the spider 10 at a rear of the drum 3 is assembled inside of the tub 1. According to this, the front bearing 6a inserted onto the outer circumference of the shaft 4 is fixed at the front bearing 6a is held both at the step 9a in a front portion of the shaft 4 and the step 202 in the hub 200 of the tub 2. Then, under a condition that the fastening holes 203 for fastening the supporting bracket formed in the hub 201 of the tub 2 and the fastening holes 801 in the supporting bracket 8 are aligned, the fastening members 15d are fastened, to fix the supporting bracket 8 to the hub 201 of the tub 2. After assembly of the supporting bracket 8 to the tub 2, the rear bearing 6b is inserted onto the shaft 4 through the rear end of the shaft 4 until the rear bearing 6b is held both at the step 9b in a rear portion of the shaft 4 and the step 800 in an inside end of the supporting bracket 8. Then, the fastening holes 802 in the periphery of the supporting bracket 8 and the fastening holes 143a in the fastening rib 143 of the stator 14 are aligned, and fastened with the fastening members 15c. Under this condition, an assembly of the rotor 13 and the connector 16 are inserted into the rear end of the shaft 4, and the fastening member 15a is screwed into the rear end of the shaft, for preventing the connector 16 from falling off the shaft by a fastening force of the fastening member 15a, thereby fixing the stator 14 to the supporting bracket 8.

The operation of the structure of a driving unit in a drum type washing machine in accordance with a fourth preferred embodiment of the present invention will be explained.

In the fourth embodiment structure of a driving unit in a drum type washing machine of the present invention, since the supporting bracket 8 is formed of a metal, such as aluminum alloy, which is involved in no thermal deformation even at a high temperature, the supporting bracket 8 is applicable to the drum type washing machine which has a drying cycle. That is, the step 800 in an inside end of the supporting bracket 8 in the fourth preferred embodiment of the present invention permits to support the front end of the rear bearing 6b. And, the positioning steps 9a and 9b in outer circumferences of front and rear portions of the shaft 4 disposed inside of the supporting bracket 8 for transmission of a driving force from the motor 5 to the drum 3 permit easy positioning of the front and rear bearings 6a and 6b with respect to the shaft 4. In the meantime, the front end of the shaft 4 is fixed to the spider 10 in the rear wall of the drum 3, and a portion of the shaft 4 from an end of the spider 10 to the front bearing 6a has a bushing 11 of brass press fit thereon, for prevention of rusting of the shaft 4. And, the sealing member 12 on an outer circumference of the bushing 11 prevents ingress of water into the bearing. The fastening holes 802 in the periphery of the supporting bracket 8 at fixed intervals along a circumference permit the fastening members 15c passed through the fastening holes 143a in the fastening ribs 143 on the stator 14 to pass through the fastening holes 802 in the supporting bracket, thereby permitting the stator 14 fixed to the supporting bracket 8, firmly. As the serration 164 on the inside circumference of the hub 201 of the connector 16 is fitted to the serration 400 on the rear end of the shaft 4, a rotation force can be transmitted from the rotor 13 to the shaft 4 through the connector 16 as it is. Since the supporting bracket 8 is fastened to the hub 201 projected forward from a central portion of the rear wall 200 of the tub in a face to face contact, and the stator 14 is fixed to the supporting bracket 8, a distance from the rear wall 200 of the tub to the stator 14 is very close, which permits to minimize a distance from the rear wall 200 of the tub to the rear wall 13a of the rotor, that permits to provide a compact product.

As has been explained, the structure of a driving unit in a drum type washing machine of the present invention has the following advantages.

The first to third embodiment structure of a driving unit in a drum type washing machine can reduce noise, trouble caused by being out of order, and power loss as it is of a motor direct coupling type.

And, the first to third embodiment structure of a driving unit in a drum type washing machine can be applicable to a product with a drying function as the drum type washing machine of the present invention has a bearing housing formed of a metal.

And, the first to third embodiment structure of a driving unit in a drum type washing machine can improve a productivity because the rotor of iron or iron alloy in the drum type washing machine of the present invention is fabricated by pressing, which has a good formability and a short fabrication time period.

And, the first to third embodiment structure of a driving unit in a drum type washing machine can improve workability in fitting magnets as the rotor has a magnet setting surface, and can prevent over heating of the motor as the rotor has draining holes, cooling fins and vent holes to improve a reliability and a lifetime of the motor.

And, the second embodiment structure of a driving unit in a drum type washing machine can prevent ingress of water dropped from the water supply valve 27 into the motor by means of the arc formed baffle on an upper portion of the bearing housing, thereby assuring a motor reliability.

And, the third embodiment structure of a driving unit in a drum type washing machine permits assembly of the stator with easy when the stator is mounted to the rear of the bearing housing owing to the self alignment action of the ribs.

And, the fourth embodiment structure of a driving unit in a drum type washing machine can also reduce noise, trouble from being out of order, and a power loss as it is of the motor direct coupling type.

And, the fourth embodiment structure of a driving unit in a drum type washing machine can be applied to a product with a dry function as the supporting bracket of a metal shows no thermal deformation.

And, the fourth embodiment structure of a driving unit in a drum type washing machine can prevent ingress of water dropped from the water supply valve into the motor 5 by means of the arc formed baffle provided at a rear of the tub, thereby assuring a reliability of the motor.

Thus, since the drum type washing machine of the present invention can improve a structure of a driving unit, to permit direct transmission of a driving force from the motor to the drum directly, noise and trouble as well as a power loss can be reduced, to improve a productivity of the rotor and the product.

It will be apparent to those skilled in the art that various modifications and variations can be made in the structure of a driving unit in a drum type washing machine of the present invention without departing from the spirit or scope of the invention. Thus, it is intended that the present invention cover the modifications and variations of this invention provided they come within the scope of the appended claims and their equivalents.

What is claimed is:

[1. A structure of a driving unit in a drum type washing machine, comprising:

a tub for storing washing water;

a drum of a metal rotatably mounted inside of the tub disposed horizontal to the ground, or with an angle to the ground for accommodating laundry therein;

a shaft connected, through the tub, to the drum mounted inside of the tub for transmission of a driving force of a motor to the drum;

bearings each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations each having a salient pole projected outward in a radial direction with respect to a central longitudinal axis of the stator, a plurality of coils each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame;

a cup formed rotor having a rotor body of magnetic material and permanent magnets, the rotor body comprising a sidewall serving as a back yoke that forms a magnetic flux path and a rear wall formed as one unit with the sidewall to cover an outer circumference and a bottom of the stator, the permanent magnets fitted to a setting surface of an "L" shaped bent portion of the sidewall; and a connector connecting the rotor and the shaft for rotating the drum.]

[2. The structure of a driving unit as claimed in claim 1, wherein the connector connecting the rotor and the shaft for rotating the drum is formed of a resin different from the material of the rotor for reducing vibration.]

[3. The structure of a driving unit as claimed in claim 2, wherein the connector includes:

a central portion;

a cylindrical hub projected from the central portion for connection with the shaft;

a cylindrical outer rib spaced from an outer circumference of the hub to provide a space for attenuating transmission of vibration between the rotor and the shaft; and reinforcing ribs between the hub and the outer rib to connect the hub and the outer rib across the space.]

[4. The structure of a driving unit as claimed in claim 3, wherein the connector further includes:

a serration on an inside of the cylindrical hub for coupling to the shaft; and positioning projections provided on one side of the connector for positioning the connector with respect to the rotor before the connector is fastened to the rotor with bolts.]

[5. The structure of a driving unit as claimed in claim 1, wherein the rotor includes:

cooling fins each formed by cutting the rear wall in a '⊂' form, and folding in a stator direction for cooling a heat generated at the stator; and openings each formed by the cutting of the rear wall and acting as vent holes for flow of air.]

[6. The structure of a driving unit as claimed in claim 5, wherein the rotor further includes:

an embossing between adjacent cooling fins on the rear wall of the rotor for reinforcement of the rotor.]

[7. The structure of a driving unit as claimed in claim 6, wherein the embossing provided for reinforcement of the rotor includes a drain hole for draining water.]

[8. The structure of a driving unit as claimed in claim 1, wherein the cup formed rotor includes a reinforced rim for maintaining a true circle when the rotor is rotated at a high speed.]

[9. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, and a frame of insulting material for covering top and bottom surfaces of a magnetic core assembly of the magnetic cores; and a cup-formed rotor having a rotor body of magnetic material and permanent magnets, the rotor body comprising a side wall and a rear wall to cover an outer circumference and a bottom of the stator, the permanent magnets fitted to the side wall, wherein the rotor includes cooling fins each formed by cutting the rear wall in a '⊂' form, and folding in a stator direction for cooling the stator.]

[10. The drum type washing machine as claimed in claim 9, wherein the rotor further includes:

openings each formed by the cutting of the rear wall and acting as vent holes for flow of air.]

[11. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, and a frame of insulating material for covering top and bottom surfaces of a magnetic core assembly of the magnetic cores;

a cup-formed rotor having a rotor body comprising a side wall and a rear wall to cover an outer circumference and a bottom of the stator, and permanent magnets fitted to the side wall; and a connector connecting the rotor and the shaft, wherein the connector is formed of resin and is configured to couple to the shaft at a central portion of the connector, and a section of the connector parallel and adjacent to an axis of rotation of the connector is substantially in the shape of a trapezoid.]

[12. The drum type washing machine as claimed in claim 11, wherein the connector includes:

a cylindrical hub projected from a central portion of the connector for connection with the shaft;

a cylindrical outer rib spaced from an outer circumference of the hub to provide a space for attenuating transmission of vibration between the rotor and the shaft; and reinforcing ribs between the hub and the outer rib to rigidly connect the hub and the outer rib.]

[13. The drum type washing machine as claimed in claim 12, wherein the connecter further includes:

a serration on an inside of the cylindrical hub for coupling to the shaft.]

[14. The drum type washing machine as claimed in claim 11, wherein the connector is formed as a separate unit from the rotor body.]

[15. The drum type washing machine as claimed in claim 11, wherein the rotor body is formed of a magnetic material.]

[16. The drum type washing machine as claimed in claim 11, wherein the connector connecting the rotor and the shaft for rotating the drum is formed of a resin different form the material of the rotor for reducing vibration.]

[17. The drum type washing machine as claimed in claim 11, wherein the connector includes:

positioning projections provided on one side of the connector for positioning the connector with respect to the rotor before the connector is fastened to the rotor with bolts.]

[18. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, and a plurality of coils, each wound around a respective one of the salient poles; and a cup-formed rotor having a rotor body comprising a side wall and a rear wall to cover an outer circumference and a bottom of the stator, and permanent magnets fitted to the side wall, wherein the rotor includes embossings on the rear wall of the rotor, disposed in a direction of a centrifugal force, for preventing the rotor from being distorted in a drying operation of the washing machine when the rotor rotates the drum containing laundry at a high speed.]

[19. The drum type washing machine as claimed in claim 18, wherein the rotor body is formed of magnetic material and the rear wall of the rotor body is formed as one unit with the side wall of the rotor body.]

[20. The drum type washing machine as claimed in claim 18, wherein the embossings protrude rearward of the rotor.]

[21. The drum type washing machine as claimed in claim 20, wherein the rotor body is formed of magnetic material and the rear wall of the rotor body is formed as one unit with the side wall of the rotor body.]

[22. The drum type washing machine as claimed in claim 20, wherein the embossings provide for reinforcement of the rotor and include drain holes for draining water.]

[23. The drum type washing machine as claimed in claim 22, wherein the rotor body is formed of magnetic material and the rear wall of the rotor body is formed as one unit with the side wall of the rotor body.]

[24. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward, a plurality of coils, each wound around a respective one of the salient poles, and a frame of insulating material for covering top and bottom surfaces of a magnetic core assembly of the magnetic cores; and a cup-formed rotor having a rotor body comprising a side wall serving as a back-yoke that forms a magnetic flux path and a rear wall formed as one unit with the side wall, to cover an outer circumference and a bottom of the stator, and permanent magnets fitted to a setting surface of an "L" shaped bent portion of the side wall.]

[25. The drum type washing machine as claimed in claim 24, wherein the rotor body includes a reinforced rim for maintaining a true circle when the rotor is rotated at a high speed.]

[26. The drum type washing machine as claimed in claim 25, wherein the reinforced rim of the rotor body is channel-sectioned.]

[27. The drum type washing machine as claimed in claim 26, wherein the side wall of the rotor body includes a magnetic material forming a magnetic flux path and disposed in a space of the side wall formed by the channel-sectioned reinforced rim.]

[28. The drum type washing machine as claimed in claim 24, wherein the rotor body is formed of a magnetic material.]

[29. A drum type washing machine, comprising:

a tub for storing washing water;

a drum of a metal rotatably mounted inside of the tub and disposed horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward, each with a fastening hole for fixing the stator to the bearing housing; and a cup-formed rotor having a rotor body comprising a side wall and a rear wall to cover an outer circumference and a bottom of the stator, and permanent magnets fitted to the side wall, wherein the stator fastening bosses are cylindrical protrusions from the bearing housing, each comprising a hole with a screw thread in a center thereof, and the stator is fastened to the bearing housing by bolting it at the holes with a screw thread through the fastening holes in the fastening ribs.]

[30. The drum type washing machine as claimed in claim 29, wherein the bearing housing is formed in the shape of a semipalmate tripod.]

[31. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame; and a cup-formed rotor having a rotor body of magnetic material and permanent magnets, the rotor body comprising a side wall serving as a back-yoke that forms a magnetic flux path and a rear wall to cover and outer circumference and a bottom of the stator, the permanent magnets fitted to the side wall, wherein the stator fastening bosses are cylindrical protrusions from the bearing housing, each comprising a hole with a screw thread in a center thereof, and the stator is fastened to the bearing housing by bolting it at the holes with a screw thread through the fastening holes in the fastening ribs.]

[32. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame;

a cup-formed rotor having a rotor body comprising a side wall and a rear wall, to cover an outer circumference and a bottom of the stator, and permanent magnets fitted to the side wall; and a connector connecting the rotor and the shaft, wherein the stator fastening bosses are cylindrical protrusions from the bearing housing.]

[33. The drum type washing machine as claimed in claim 32, wherein the bearing housing is formed in the shape of a semipalmate tripod.]

[34. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame; and a cup-formed rotor having a rotor body comprising a side wall and a rear wall, to cover an outer circumference and a bottom of the stator, and permanent magnets fitted to the side wall, wherein the rotor includes cooling fins each formed by cutting the rear wall in a '⊂' form, and folding in a stator direction for cooling the stator, and wherein the stator fastening bosses are cylindrical protrusions from the bearing housing.]

[35. The drum type washing machine as claimed in claim 34, wherein the bearing housing is formed in the shape of a semipalmate tripod.]

[36. A drum type washing machine, comprising:

a tub for storing washing water;

a drum of a metal rotatably mounted inside of the tub and disposed one of horizontal of the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame; and a cup-formed rotor having a rotor body comprising a side wall and a rear wall, to cover an outer circumference and a bottom of the stator, and permanent magnets fitted to the side wall, wherein the rotor includes embossings on the rear wall of the rotor for reinforcement of the rotor, and wherein the stator fastening bosses are cylindrical protrusions from the bearing housing.]

[37. The drum type washing machine as claimed in claim 36, wherein the bearing housing is formed in the shape of a semipalmate tripod.]

[38. A drum type washing machine, comprising:

a tub for storing washing water;

a drum of a metal rotatably mounted inside of the tub disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, and a frame of insulating material for covering top and bottom surfaces of a magnetic core assembly of the magnetic cores; and a cup-formed rotor having a rotor body of magnetic material and permanent magnets, the rotor body comprising a side wall serving as a back-yoke that forms a magnetic flux path and a rear wall to cover an outer circumference and a bottom of the stator, the permanent magnets fitted to the side wall, wherein the bearing housing extends up to an outer circumference of the tub, to be fixed to tub brackets fixed to an outer circumference of the tub at a rear portion of the tub.]

[39. A drum type washing machine, comprising:

a tub for storing washing water;

a drum of a metal rotatably mounted inside of the rub an disposed one of horizontal to the ground or with an angle to the ground, for accommodating laundry therein;

a shaft connected, through the tub, to the drum mounted inside of the rub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame;

a cup-formed rotor having a rotor body comprising a side wall and a rear wall, to cover an outer circumference and a bottom of the stator, and permanent magnets fitted to the side wall; and a connector connecting the rotor and the shaft, wherein the bearing housing extends up to an outer circumference of the tub, to be fixed to tub brackets fixed to an outer circumference of the tub at a rear portion of the tub.]

[40. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame; and a cup-formed rotor having a rotor body comprising a side wall and a rear wall, to cover an outer circumference and a bottom of the stator, and permanent magnets fitted to the side wall, wherein the rotor includes cooling fins each formed by cutting the rear wall in a '⊂' form, and folding in a stator direction for cooling the stator, and wherein the bearing housing extends up to an outer circumference of the rub, to be fixed to tub brackets fixed to an outer circumference of the tub at a rear portion of the tub.]

[41. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame; and a cup-formed rotor having a rotor body comprising a side wall and a rear wall, to cover an outer circumference and a bottom of the stator, and permanent magnets fitted to the side wall, wherein the rotor includes embossings on the rear wall of the rotor for reinforcement of the rotor, and wherein the bearing housing extends up to an outer circumference of the tub, to be fixed to tub brackets fixed to an outer circumference of the tub at a rear portion of the tub.]

[42. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame; and a cup-formed rotor having a rotor body comprising a side wall and a rear wall, to cover an outer circumference and a bottom of the stator, and permanent magnets fitted to the side wall, wherein the stator fastening bosses are cylindrical protrusions from the bearing housing.]

[43. The drum type washing machine as claimed in claim 42, wherein the bearing housing if formed in the shape of a semipalmate tripod.]

[44. A drum type washing machine, comprising:

a tub for storing washing water;

a drum of a metal rotatably mounted inside of the tub and disposed one of horizontal to the ground or with an angle to the ground, for accommodating laundry therein;

a shaft connected, through the tub, to the drum mounted inside of the tub, for transmission of a driving force of a motor to the drum;

bearings, each fitted onto an outer circumference of the shaft for supporting the shaft;

a bearing housing having a central portion and stator fastening bosses disposed at fixed intervals along a circumference of the central portion, for supporting the bearings;

a stator having a plurality of magnetic cores formed by stacking magnetic laminations, each having a salient pole projected outward in a radial direction with respect to a central longitudinal axis of the stator, a plurality of coils, each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame; and a cup-formed rotor having a rotor body comprising a side wall and a rear wall, to cover an outer circumference and a bottom of the stator, and permanent magnets fitted to the side wall, wherein the bearing housing extends up to an outer circumference of the tub, to be fixed to the tub brackets fixed to an outer circumference of the tub at a rear portion of the tub.]

[45. A drum type washing machine, comprising:

a tub configured to store washing water;

a drum for accommodating laundry therein rotatably mounted inside of the tub;

a shaft connected, through the tub, to the drum and configured to transmit a driving force of a motor to the drum;

bearings, each fitted onto an outer circumference of the shaft for supporting the shaft;

a stator having a plurality of magnetic cores formed by stacking magnetic laminations, each having a salient pole that projects outward in a radial direction with respect to a central axis of the stator, a plurality of coils each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame;

a cup formed rotor having a rotor body and permanent magnets, the rotor body comprising a sidewall serving as a back yoke that forms a magnetic flux path, and a rear wall; and a connector configured to connect the rotor and the shaft.]

[46. In a washing machine including a tub having a rear side with a bottom wall, a rigid star carrier attached to the bottom wall of the tub and having a bearing sleeve, an at least approximately horizontally disposed shaft mounted in the bearing sleeve, and a laundry drum mounted on the shaft, a drive device to be mounted at the rear side of the tub for directly driving the shaft, comprising:

a flat motor having a stator carrying part with exciting windings and rotor with magnetizable poles, wherein said stator carrying part and said rotor are connected to one another and, wherein that stator carrying part comprises a plurality of magnetic cores formed by stacking magnetic laminations, each having a salient pole projected outward in a radial direction with respect to a central longitudinal axis of the stator, a plurality of coils each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame.]

[47. A drum type washing machine, comprising:

an outer cabinet;

a water tub elastically supported in the outer cabinet;

a drum type rotatable tub provided in the water tub to be rotated about a horizontal axis;

a rotatable tub shaft mounted to the rotatable tub outside the cavity and extending outward from the central portion of the end plate of the rotatable tub; and a motor driving the rotatable tub via the rotatable tub shaft and including a rotor mounted on the other end of the rotatable tub shaft and a stator fixed in relation to the water tub and disposed inside the rotor, wherein the stator comprises a plurality of magnetic cores formed by stacking magnetic laminations, each having a salient pole projected outward in a radial direction with respect to a central longitudinal axis of the stator, a plurality of coils each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame.]

[48. An apparatus for treating laundry, comprising:

a drum;

a substantially horizontal axle for rotatably mounting the drum; and a motor comprising a rotor comprising a predetermined number of permanent magnets and a stator including a plurality of magnetic cores formed by stacking magnetic laminations, each having a salient pole projected outward in a radial direction with respect to a central longitudinal axis of the stator, a plurality of coils each wound around a respective one of the salient poles, a frame of insulating material for covering top and bottom surfaces of a magnetic core assembly of the magnetic cores, and a plurality of fastening ribs projected inward in the radial direction, the fastening ribs formed as one unit with the frame.]

*49. A washing machine, comprising:*

*an outer tub;*

*an inner tub rotatably mounted within the outer tub;*

*a drive shaft attached to the inner tub;*

*a stator having a coil;*

*a rotor attached to the drive shaft and comprising a frame that covers at least a portion of the stator;*

*a bearing housing attached to the outer tub and the stator; and*

*a skirt attached to or formed integrally with at least one of the bearing housing or the outer tub, the skirt extending outward from at least one of the bearing housing or the outer tub and enclosing at least a portion of the stator and rotor so as to shield the stator and rotor from water, wherein the skirt is entirely spaced apart from the stator and rotor.*

*50. The washing machine of claim 49, wherein the skirt extends from the bearing housing.*

*51. The washing machine of claim 50, wherein the skirt is formed integral with the bearing housing.*

*52. The washing machine of claim 49, wherein the skirt extends beyond an edge of the rotor.*

*53. The washing machine of claim 49, wherein the skirt extends around only a portion of a circumference of the rotor.*

*54. The washing machine of claim 49, wherein said at least a portion of the rotor and the stator is disposed within a space defined by the skirt.*

*55. The washing machine of claim 49, wherein the skirt is slanted toward the outer tub.*

*56. The washing machine of claim 49, wherein the skirt is slanted away from the rotor and the stator.*

*57. The washing machine of claim 49, wherein the skirt is spaced apart from outer surfaces of the stator and the rotor.*

*58. The washing machine of claim 49, wherein the outer tub is disposed substantially horizontal to the ground, and the skirt is disposed above the rotor and the stator.*

*59. The washing machine of claim 49, wherein the bearing housing is attached on an outer surface of the outer tub.*

*60. The washing machine of claim 49, wherein the stator is attached to an extension extending in a radial direction from a center portion of the bearing housing.*

*61. The washing machine of claim 49, wherein the bearing housing includes a recess configured to receive the stator, and the recess comprises a plurality of step portions serially disposed in a radial direction.*

* * * * *